United States Patent [19]
Katznelson

[11] Patent Number: 5,864,621
[45] Date of Patent: *Jan. 26, 1999

[54] BROADBAND TELEVISION SCRAMBLING AND DESCRAMBLING SYSTEM

[75] Inventor: Ron D. Katznelson, San Diego, Calif.

[73] Assignee: Multichannel Communication Sciences, Inc., San Diego, Calif.

[*] Notice: The term of this patent shall not extend beyond the expiration date of Pat. No. 5,430,799.

[21] Appl. No.: 662,504

[22] Filed: Jun. 12, 1996

Related U.S. Application Data

[63] Continuation of Ser. No. 534,340, Sep. 27, 1995, abandoned, which is a continuation of Ser. No. 256,379, filed as PCT/US93/00148 Jan. 7, 1993, abandoned, which is a continuation-in-part of Ser. No. 818,752, Jan. 8, 1992, abandoned.

[51] Int. Cl.$^6$ .................................................. H04N 7/167
[52] U.S. Cl. ............................................... 380/15; 380/12
[58] Field of Search ............................... 380/15, 10, 20, 380/34, 12, 17

[56] References Cited

U.S. PATENT DOCUMENTS 4,330,794   5/1982   Sherwood .

OTHER PUBLICATIONS

Homiller, W.T. "Headend Techniques for Reducing Distortion in Distribution Systems" pp. 94–99, National Cable Television Assoc. Technical Papers Jun. 12–15, 1983.

Primary Examiner—Gilberto Barrón, Jr.
Attorney, Agent, or Firm—Robert C. Strawbrich

[57] ABSTRACT

A multichannel television access control system is disclosed wherein processing of the broadband signal is performed by gated coherent RF injection on a plurality of channels, thereby effecting selective descrambling of an arbitrary subset of channels in a channel group. The system provides for a closed loop injection signal phasor control so as to maintain substantially constant relationship between the television signals and the injected signals. The combined signals are supplied to subscribers enabling the use of their cable ready equipment.

61 Claims, 18 Drawing Sheets

INJECTED RF CARRIERS

STAGGERED GROUPING IN TIME DOMAIN

FREQUENCY BLOCK GROUPING

FREQUENCY INTERLACED GROUPING

INJECTED RF CARRIERS

BROADBAND TELEVISION SCRAMBLING AND DESCRAMBLING SYSTEM

This is a File Wrapper Continuation of Applicant's Parent application Ser. No. 08/534,340 filed on Sep. 27,195, now abandoned; which was a File Wrapper Continuation of Applicant's Grandparent application Ser. No. 08/256,379 filed Sep. 21, 1994now abandoned; which was based on PCT/US93/00148 filed Jan. 7, 1993, which was a CIP of U.S. application Ser. No. 07/818,752 filed Jan. 8, 1992, now abandoned.

FIELD OF THE INVENTION

The present invention relates generally to television transmission and receiving systems and more particularly to CATV or over-the-air multichannel systems wherein a plurality of standard television signals are scrambled by suppression of normal synchronizing pulses or otherwise modified during the active video time and subsequently selectively descrambled at authorized subscriber locations in a manner which simultaneously renders a plurality of authorized channels to be provided unscrambled to the subscriber's television set.

BACKGROUND OF THE INVENTION

In subscription television, or pay television, programming signals of premium channels are typically transmitted in a scrambled form so that unauthorized viewers, that is, viewers who do not pay to receive the specific programming, are not able to view the transmitted signal on their television receivers. Authorized viewers are provided with means to descramble or decode the scrambled television signal and usually such descrambling means are capable of being selectively enabled to descramble specific channels. This enablement can be done remotely by the service provider or the CATV operator, by selective addressing of individual descrambling means associated with subscribers who paid to receive the scrambled programming.

A technique commonly used for television scrambling is that of sync-suppression wherein the RF level of the horizontal and vertical synchronizing pulses is suppressed to a level below that of the video so that the standard television receiver is unable to establish regular synchrony and instead erratically locks on RF peaks in the active video thereby creating unviewable picture on the television set. In addition, the ability of the television receiver to use the color reference burst associated with the horizontal synchronizing pulse is severely degraded thereby causing distorted color reproduction or disabling the color circuitry of the television set. Exemplary prior art sync suppression systems are disclosed in U.S. Pat. Nos. 3,184,537 to Court et al; 3,478,166 to Reiter et al; 3,530,232 to Reiter et al and 4,222,068 to Thompson. In these systems, the horizontal synchronizing levels are suppressed or reduced to gray level and an additional keying control signal is normally transmitted together with the scrambled television signal for controlling reconstruction or regeneration of the proper sync levels at the authorized descrambler, thereby providing unscrambled normal television signal at the receiver. For example, in U.S. Pat. No. 3,184,537 the audio subcarrier is amplitude modulated with a suitable sync insertion control signal. In U.S. Pat. No. 4,222,068 horizontal sync reconstruction at the authorized descrambler is effected by transmitting normal sync signals during the Vertical Blanking Interval ("VBI") of the television signal for enabling a timing circuit at the receiver to lock on the horizontal components thereof. The timing circuit is then used to gate the Horizontal Blanking Interval ("HBI") thereby facilitating the restoration of the horizontal synchronizing pulses in the composite baseband video signal.

Sync suppression systems normally operate in one of two ways: The first method, as in U.S. Pat. No. 3,184,537, is based on attenuating the modulated RP television signal during the HBI (and in some cases during the VBI as well) by a known fixed amount such as 6 Db. At the authorized descrambler, the signal is descrambled by attenuating the RF received signal during the active video portion by the same known amount. This method is known as "RF sync suppression" since the scrambling and descrambling processes occur at RF stages after the modulation process at the transmitter and before the demodulation process at the receiver respectively. The second sync suppression method is known as "Baseband Sync Suppression" wherein a known gated offset level is added to the baseband video signal during the HBI, thereby suppressing the horizontal synchronizing signal. At the authorized descrambler, an equal offset level is subtracted from the demodulated video signal during the HBI, thereby restoring the horizontal synchronizing signal levels to their normal values. An example of Baseband sync suppression system is disclosed in U.S. Pat. No. 4,222,068.

Both prior art RF and baseband sync suppression descrambling systems described above are typically accomplished by incorporating the timing and descrambling circuitry with a television tuner and demodulator, often termed a converter, that can cover the entire CATV band or over-the-air channels used by the subscription television service provider. In RF sync suppression systems, descrambling is effected by gated attenuation at the IF stage of the converter or at its fixed RF output channel frequency such as TV channel 3 or 4. In baseband sync suppression systems, descrambling is effected at the demodulated video stage of the converter and the resultant normal video signal is remodulated by means of a fixed frequency television modulator operating on channel 3 or 4. Thus, in both examples, the subscriber is equipped with a converter-descrambler device capable of tuning and descrambling a single channel at a time and converting it to channel 3 or 4 (output channel), whichever is unused by a local broadcast station. The subscriber's television set may permanently remain tuned to the converter-descrambler output channel while channel selection is done by means of the converter-descrambler tuner.

In a subscription television service, a plurality of scrambled channels may be transmitted simultaneously on several channels. However, as explained above, prior art converter-descramblers can only process one channel at a time. This means that subscriber households who are authorized to receive several premium scrambled channels, cannot receive these services descrambled simultaneously. So for example, if dad wishes to watch a "pay-per-view" event such as a championship fight, while the kids watch the Disney Channel on the second television set, the household would require two converter-descramblers. Furthermore, if mom wanted to record a movie on HBO at the same time, a third converter-descrambler must be employed in conjunction with the Video Cassette Recorder ("VCR"). This is clearly one of the disadvantages of prior art single channel descrambling techniques.

Most television households in America are equipped with "Cable ready" television sets or VCR's. The term "Cable ready equipment" should be understood as consumer television equipment with expanded frequency tuning capability that allows a subscriber to tune not only the off-air broadcast channel frequencies but also all CATV channels. A significant portion of the cable ready equipment sold in America contains additional features such as Multichannel Television Sound ("MTS") allowing reception of stereo TV programming or second audio programming ("SAP"), remote control to control sound level or sound muting as well as channel tuning. Still another feature of some cable ready television sets is the Picture-In-Picture ("PIP") display capability allowing the subscriber to simultaneously watch one program while observing additional video program(s) in a picture inset displayed within the main picture. When this cable ready equipment is connected directly to the cable drop entering the household, the subscriber is usually able to receive and record all non-scrambled channels without the aid of a converter and thus use his equipment's special features described above to receive such non-scrambled signals. The problem occurs when the CATV system employs signal scrambling as means of controlling access to the premium channels.

Normally in these circumstances, being fed by the converter-descrambler's output channel, the television set is permanently tuned to channel 3 (or 4) while the converter-descrambler is tuned to the desired channel. Thus, the remote control purchased with the television set is unused, and an additional remote control unit must be provided for the converter-descrambler. Moreover, many prior art baseband converter-descramblers cannot pass the composite MTS audio program material and thus the stereo signal and the SAP are lost despite the fact the television set may be capable of receiving MTS. Recent attempts to address this problem typically involve a stereo bypass operating mode as disclosed in U.S. Pat. No. 4,630,113 to Long, which unfortunately disables the remote volume control of the converter, or alternatively by dematrixing and reprocessing the stereo signal at the converter in order to effect volume control with resultant degradation of stereo separation and compander performance. Even prior art RF sync suppression descramblers tend to introduce MTS audio performance degradations since they pass the audio subcarrier with additional amplitude modulation at the horizontal line rate thereby causing AM to FM effects at the television receiver. These audio degrading effects are discussed in an article by J. O. Farmer entitled "Operational Characteristics of Modern Set-Top Terminals" published in the *Technical Papers of the 33rd Annual Convention of the NCTA* in Las Vegas, Jun. 3–6, 1984 and in the *IEEE Transactions on Consumer Electronics*, Vol. CE-30, pages 489–502, August 1984. Finally, the PIP feature of new television sets requires that the TV set be able to receive multiple channels simultaneously, a requirement that obviously cannot be met by current prior art converter-descramblers. Clearly, all these problems constitute yet another set of significant disadvantages of the prior art single channel descrambling techniques.

Collectively, the foregoing deficiencies discussed above are known in the industry as the "CATV consumer interface" problem. There is a growing body of evidence that these consumer interface problems present severe hardships on consumers and CATV operators alike. Specific evidence and indication of the public interest in this regard is expressed by legislation cited as the "Cable Ready Equipment Act of 1991" recently proposed by Senator Patrick Leahy in U.S. Senate Bill S. 2063, published in the Congressional Record—Senate, pages S18377–S18380, Nov. 26, 1991. Leahy's bill seeks to encourage solutions to the CATV consumer interface problems described above.

It may be easily understood that the most desirable solution to the problems discussed above is to provide the subscriber with a cable drop which carries all the channels to which he/she is entitled in unscrambled form ("in the clear"). The subscriber can then connect by proper broadband RF signal splitting means multiple cable ready television sets and VCR's and freely enjoy all of the consumer features that were purchased with that equipment. Since the CATV system may be carrying other channels not purchased by the subscriber, an effective means is required to limit a subscriber's access only to those channels and special events for which subscription fees have been paid.

If one attempts to employ prior art single channel descrambling techniques in order to provide each subscriber with simultaneous multichannel descrambling, one would have to provide each subscriber with a multiplicity of prior art descrambling means wherein each descrambler is tuned and dedicated to one scrambled channel. The outputs of such descramblers must then be assigned distinct channel frequencies and must be combined by means of a diplexer with all non-scrambled channels to form a broadband multichannel clear signal service entering the subscriber home. Clearly, the cost per subscriber for such an arrangement could reach the prohibitive value of the cost of one descrambler times the number of processed channels.

There thus exists the need for an effective low cost system for simultaneously descrambling an arbitrary subset of a plurality of scrambled channels, said arbitrary channel subset being the channels to which the subscriber has subscribed, and supply them together with the basic non-scrambled channels into the home in such a manner that all authorized channels are supplied 'in the clear' and all scrambled channels not purchased by the subscriber are passed through into the home either in their original scrambled form, or preferably with additional security added to further deny any unauthorized access by "piratical" devices.

SUMMARY OF THE INVENTION

The present invention is directed to subscription television system employing video scrambling on a plurality of channels. A broadband multichannel simultaneous processing system is disclosed which performs descrambling and other access control functions on a plurality of addressable selected channels in accordance with the subscriber authorization to receive each channel.

It is an object of the present invention to provide a simultaneous multichannel television descrambling system of the type described, enabling the cable ready and other consumer features contained in the subscriber's television sets and VCR's to be fully utilized by the subscriber.

It is a further object of the present invention to provide a scrambling and descrambling system of the type described which introduces virtually no artifacts or distortion in either the audio or video signals on descrambled and non-scrambled channels, wherein video quality is not compromised and functions such as MTS stereo are not degraded or affected.

It is still another object of the invention to provide a subscription television access control system that offers CATV system operators the ability to migrate currently used prior art systems to a new encryption based multichannel video scrambling method with an improved head end originated security scheme providing an enhanced security. Such system shall allow migration to the new encryption based security system on any channel for which all authorized subscribers are served by an installed access control device of the present invention.

To that end and other objectives, a method for processing a broadband signal comprised of a plurality of amplitude modulated television signals comprising the steps of generating a plurality of radio frequency (RF) signals in phase synchrony with at least a portion of said television signals, each of said plurality of generated RF signals having phasor values; combining said broadband signal with said generated RF signals, and adjusting said phasor values of each of said plurality of generated RF signals in accordance with corresponding phasor values of said television signals so as to maintain a substantially constant relationship therebetween.

BRIEF DESCRIPTION OF DRAWINGS

To the accomplishment of the above and such further objects as may hereinafter appear, the present invention relates to a television access control system substantially as defined in the appended claims, and as described in the following detailed specification as considered in conjunction with the accompanying drawings, in which:

DETAILED DESCRIPTION OF PREFERRED EMBODIMENTS

It should be appreciated that since the object of the present invention is to provide all channels to the subscribers in a broadband form and that only certain channels must be descrambled, and hence modified, the approach taken according to the present invention is to avoid any single channel filtering or tuning techniques but rather focus on techniques that involve broadband signal addition in such a manner as to modify (descramble) only selected channels. From the outset, it is instructive first to observe that both baseband sync suppression and RF sync suppression scrambling constitute a linear modifying process in the radio frequency domain. This linear process is active only during the blanking intervals in which suppression occurs. This means that for each of these two scrambling process, there exists an additive RF signal pulse of the appropriate onset time, duration, amplitude envelope, frequency and phase, such that when added to the scrambled RF signal, results in an RF television signal with normal synchronizing signals, and hence unscrambled.

Figure 1A:
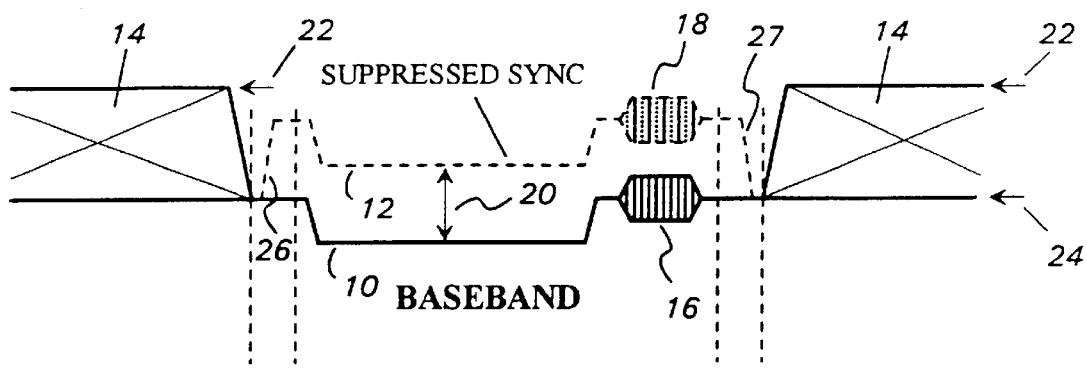
FIG. 1a is a baseband sync suppression waveform.
Figure 1B:
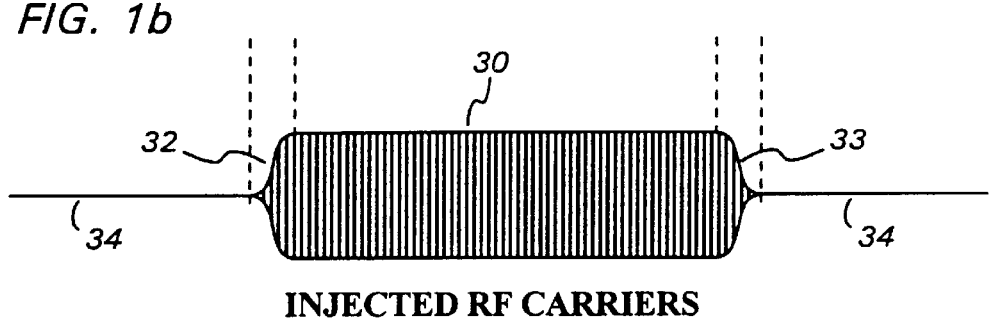
FIG. 1b is the coherent RF injected signal for descrambling the signal of FIG. 1a in accordance with the present invention.

FIG. 1a depicts the baseband video signal during the HBI in a baseband sync suppression system. As can be seen, the normal sync signal 10 is suppressed by adding at the scrambler a baseband offset signal of magnitude 20 during the HBI which results in suppressed sync signal 12, while the active video signal 14 is unmodified. Furthermore, as can be seen in FIG. 1a, the color reference burst signal 16 is unmodified but merely superimposed on an offset level of magnitude 20 in the figure. To those skilled in the art of television modulation, it is well known that the sync level 10 (−40 IRE units) corresponds to peak RF amplitude while video white level 22 (100 IRE level) corresponds to an RF amplitude that is 12.5% of peak RF amplitude. Thus, in this inverted modulation scale of the RF domain, the HBI gated offset level 20 at baseband is equivalent to the subtraction of an RF pulse shown in FIG. 1b from an otherwise non-scrambled RF television signal. The frequency and phase of this RF pulse is equal to those of the picture carrier of the television signal. Hence, in order to restore a baseband sync suppression signal corresponding to 12 to it's unscrambled mode, one can add a coherent RF pulse train with the horizontal synchronizing repetition rate, coinciding in time with the HBI as shown in FIG. 1b, with the appropriate amplitude 30 and in phase with the picture carrier so as to obtain an unscrambled signal, the baseband representation of which corresponds to 10. During the active video time 34, essentially no RF signal must be present.

Of course such addition at RF, hereinafter termed "Coherent RF Injection", must be effected with appreciable amplitude, phase and timing precision so as to obtain essentially an unscrambled signal. For example, a common baseband sync suppression system used in the American CATV market is essentially in accordance with U.S. Pat. No. 4,222,068 wherein the baseband sync level shift 20 is set to 70 IRE units. Thus, in this case, using the standard television modulation scale, it can be shown that the in-phase coherent RF injection level 30 required to effect descrambling must have an amplitude corresponding to 44.75% of the peak RF level of the non-scrambled portion of the signal. Moderate errors in the level of such injected RF pulse may not affect the proper synchronizing of the television receiver for satisfactory viewing of unscrambled programs, but may cause errors in the black reference level of the television set. This is because most sets establish their black video reference level by sampling the 0 IRE level 24 during the color burst 16 period. However, generally accepted video specifications embodied in the well known RS-170A standard allow for fixed errors up to ±2 IRE in black level. These error levels are permissible and are undetected for all practical purposes.

Similarly, the injection phase of the RF pulse must be within approximately ±6° of the picture carrier phase. Because the injected RF amplitude is nearly equal to that of the suppressed sync amplitude, these injection phase errors would result in total false phase modulation of the picture carrier by no more than ±3° during the HBI. This requirement limiting the phase error to ±3° stems from two different considerations: The first is related to the fact that good broadcast television engineering practice requires that Incidental Phase Modulation ("ICPM") shall not exceed 3° so as not to cause perceptible intercarrier audio buzz or MCS stereo distortion. The second reason for this accuracy requirement stems from the fact that this phase error only exists during the HBI, within which the color reference burst signal 16 is received, and not during the active video time 14. The RF phase shift during the HBI causes an equal baseband phase shift in the detected color reference signal, thereby causing color errors in the detected chrominance signal during the active video. Subjective tests evaluating the permissible color reference phase errors in NTSC television signals were conducted by Bernard D. Loughlin of the Hazeltine Corporation and reported in a chapter entitled "Nonlinear Amplitude Relations and Gamma Correction" on pages 63–91 in a book edited by Ted Rzeszewski entitled *Color Television* published by the IEEE, 1984. FIGS. 11–27 in this chapter shows that phase errors of ±3° are not perceptible by at least 80% of observers.

Based on the permissible amplitude and phase error magnitudes discussed above, it can be shown that the required accuracy of coherently injected RF signals for descrambling can be characterized by an ideal errorless injection signal accompanied by an injection RF phasor error of magnitude not exceeding −20 Db as compared to the desired injected RF signal. As will be subsequently appreciated, this permissible error level facilitates a low cost embodiment of the present invention for simultaneous injection of a plurality of channels.

Reference is now made to FIG. 1a in which the onset and termination of sync suppression for every horizontal video line at baseband is shown as level transitions 26 and 27 respectively. These baseband transitions at the scrambler take place over a time duration not exceeding two hundred nanoseconds, consistent with a standard television video bandwidth of 4.2 Mhz. Upon descrambling of such signals, it is preferable to match these transition times when the sync offset level is removed at the descrambler in accordance with the present invention by coherent injection of an RF pulse shown in FIG. 1b. Here, the onset and termination periods of the injected RF pulse are designated by 32 and 33 respectively. Thus, their durations would preferably each be no longer than two hundred nanoseconds.

If the pulse shape of the injected RF envelope of FIG. 1b is attempted by means of an amplitude pulse modulator with video bandwidth, the fast rise-times 32 and 33 would generate double sideband spectral broadening of up to 4.2 Mhz above and below the picture carrier frequency. The upper sideband content of this injected signal will be contained within the desired normal television bandwidth as transmitted in Vestigial Sideband ("VSB") Modulation. However, since the injected signal is assumed to be combined with the received signal in a broadband combiner, the lower sideband of the injected signal may interfere with a lower adjacent television channel and in particular with it's audio subcarrier located only 1.5 Mhz below the picture carrier of the descrambled channel. If, instead, longer transition times are assigned for 32 and 33 so as to limit the spectral broadening of the amplitude modulated pulse to less than 1.5 MHz, the descrambled video signal will contain front and back porch transients with durations in the microsecond range, which may invade the leading edge of the horizontal synchronizing signal 12 or the active video time 14 of the descrambled signal, thereby delivering a degraded video signal to the subscriber which may cause false horizontal sync or unstable video clamping action by the television set.

These two conflicting requirements in the frequency domain and in the time domain as discussed above, can be resolved by turning to the very method which allow fast video transitions in television transmission without lower sideband spectral expansion, namely, the use of VSB modulation techniques for the transitions 32 and 33 prior to the RF combining with the scrambled signal. This will allow the television receiver to process the upper sideband containing up to 4.2 MHz wide energy associated with fast baseband transitions while limiting the lower sideband expansion below 1.5 MHz and thus preventing the associated interference to the lower adjacent channel. An elaboration on the digital embodiments which facilitate such VSB spectral shaping of the injected signal will be found in subsequent sections below.

The coherent gated RF injection described above can be useful for purposes other than descrambling. Provisions are made in the present invention for implementing signal denial techniques for non authorized subscribers on a channel by channel basis. In contrast to the descrambling case, in these signal denial cases, the coherent gated RF injection of FIG. 1b can be effected in opposite phase to that of the picture carrier of the television signal, thereby further suppressing or nulling the synchronizing signals and optionally, with sufficient injection level, even reversing the resultant RF phase of the received television signal during the HBI. This method results in enhanced security for unauthorized subscribers since it denies "pirate" decoders the ability to reconstruct the sync signals and further causes phase discontinuity in the intercarrier audio detector of the television set, thereby introducing disturbing audio buzz and further audio noise masking in some television sets. It should be understood that coherent RF injection for denial of the type described above must also be gated during the HBI using VSB transition modulation so as to prevent interference to the lower adjacent channel that may otherwise be clear or authorized for descrambling.

Thus far, processing of the television signals at RF by coherent injection was discussed in a context of a single channel. Clearly, the main reason to use RF injection techniques is to offer simultaneous processing of this novel type for a plurality of channels. This means that coherent injection should take place at each frequency for which either descrambling or further sync denial is required.

Figures 2A, 2B, 2C:
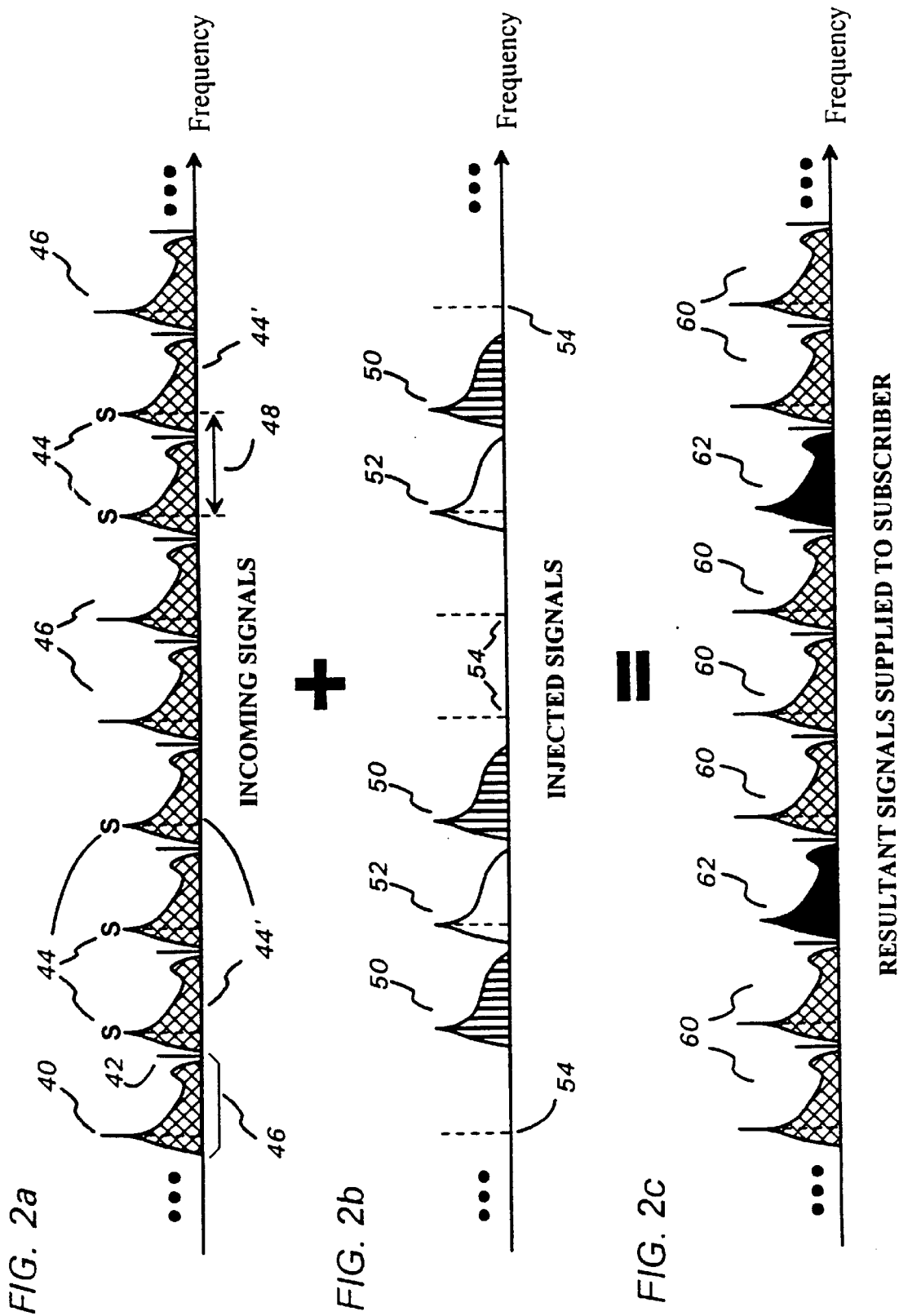
FIG. 2a is the spectrum of the television channels entering the multichannel descrambler of the present invention.
FIG. 2b is the spectrum of the injected signals generated by the broadband generator of the present invention.
FIG. 2c is the descrambled broadband spectrum supplied to the subscriber from the multichannel descrambler of the present invention.

FIG. 2a depicts a portion of the broadband spectrum of the incoming signal carried on the CATV system entering the multichannel descrambler of the present invention. Each television channel contains a picture carrier 40 and an audio subcarrier 42 separated by 4.5 MHz from the picture carrier 40. The channel spacing 48 is 6 MHz. As can be seen, the spectra of the television signals appears asymmetric about its picture carrier frequency as it is upper sideband VSB modulated. In FIG. 2a one can observe two types of channels being transmitted down the CATV distribution. The first constitutes all the non-scrambled channels 46 for which all subscribers are authorized and thus we assume no processing is required. The second type of channels carried is the sync suppressed scrambled channels 44, designated with the letter S. In this example the assumption is made that the subscriber has purchased subscriptions for a portion of the premium scrambled channels 44, said channel portion designated here by 44'. Consequently, the required RF injection spectrum corresponding to this subscription configuration is depicted schematically in FIG. 2b. Each signal in FIG. 2b is assumed to be generated within the multichannel descrambler of the present invention and combined in phase lock with its respective transmitted counterpart picture carrier of the same frequency in FIG. 2a. The broadband composite signal of FIG. 2b is coherently injected and thus linearly combined with the broadband incoming signal of FIG. 2a to form the composite broadband signal depicted in FIG. 2c that is subsequently provided to the subscriber for his/her viewing pleasure. The injected signals 50,52 consists of VSB injection signals with time domain profiles of the type depicted in FIG. 1b. The injected RF signals 50 are injected in phase with respect to their corresponding incoming scrambled signals 44', thereby effecting simultaneous descrambling and resulting in clear channels 60 of FIG. 2c being provided to the subscriber. In contrast, the injected RF signals 52 are injected out of phase, thereby causing sync null or other signal denial effects such as sync phase reversal. The resultant television signals 62 are not viewable or otherwise useful to the unauthorized subscriber. However, because of the broadband characteristics of this combining system, they are fed to the subscriber along with all other clear signals 60.

Because the injected signals 50 and 52 all have identical temporal profile as that of FIG. 1b, their simultaneous generation as a group can be made much simpler if they are all required at the same time, that is if the HBI of all television signals in the channel group of FIG. 2a coincides in time repeatedly. This relative timing coincidence condition among this group of video channels is well known to those skilled in the art of video engineering as "frame synchronous" video sources. This condition can be accomplished at the CATV headend before each channel is modulated by means of video frame synchronizers providing video outputs genlocked to a master video synchronizing source.

It will become apparent in following discussions regarding preferred embodiments of the present invention that another appreciable subscriber injection generator simplification can be realized in CATV systems that employ picture carrier frequency assignments and control in accordance with an Incrementally Related Carrier ("IRC") or Harmonically Related Carrier .("HRC") channel plan, at least within that channel portion of the band that is being processed in accordance with the present invention. This simplification is related to the fact that under such conditions, the composite RF signal of FIG. 2b can be derived from a periodic signal with fundamental periodicity equal to the Incremental frequency 48 separating any two nearest channels within the group. This RF synchrony condition can be effected at the CATV headend by phase locking all modulators in the channel group to an appropriate IRC or HRC comb signal as disclosed for example by the present inventor in U.S. Pat. No. 5,125,100 and in the cited references therein, or in U.S. Pat. No. 4,099,123 to Finlay et al.

Figure 3:
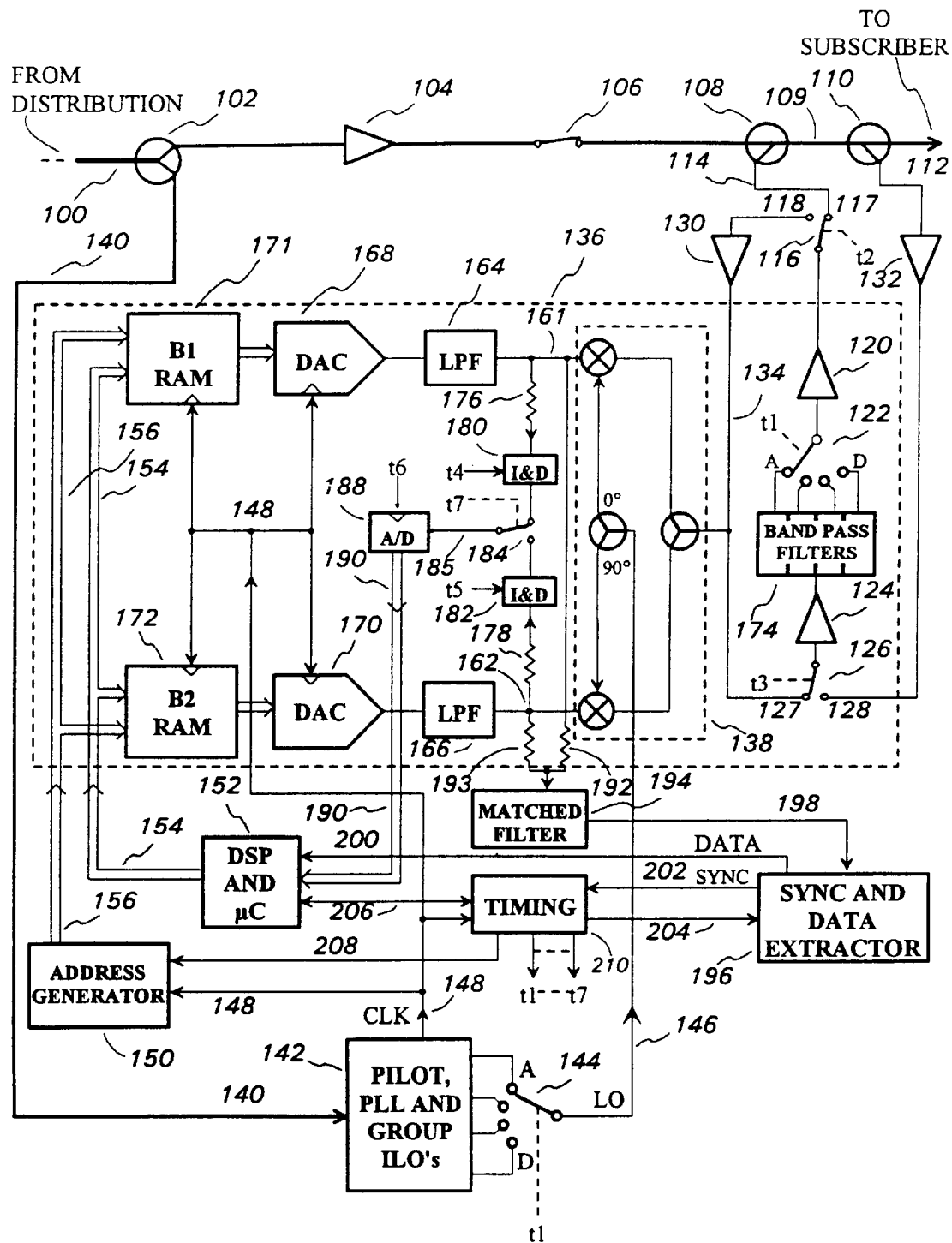
FIG. 3 is the first preferred embodiment of the present invention.

A first preferred embodiment of the present invention is depicted in FIG. 3. The assumption is made that the headend video frame synchronization and IRC or HRC carrier phase locking is effected as discussed above. The broadband incoming signal containing all transmitted channels arrives on line 100. A portion of the power of the broadband signal is coupled to a broadband amplifier 104 via a power splitter 102. When the subscriber is authorized, RF switch 106 is closed and the amplified broadband signal corresponding to FIG. 2a feeds the directional coupler 108. The injected signals corresponding to FIG. 2b, each having a temporal profile in accordance with FIG. 1b, are combined through line 114 with the amplified broadband signal by directional coupler 108, resulting in the composite signal of FIG. 2c on line 109. The broadband signal on line 109 is fed to the subscriber port 112 through directional tap 110. The injected signals 50 and 52 of FIG. 2b forming together the composite signal injected at line 114 are generated by a digital broadband generator 136 feeding RF switch 116. During the time in which injection is required, RF switch 116 is at position 117 as shown in the figure.

The Digital broadband generator 136 is capable of generating signals 50 and 52 situated on arbitrary subset of frequency points on a 6 MHz grid centered about a center local oscillator frequency fed on line 146. These signals are generated by means of quadrature modulator 138 being fed with appropriate baseband signals on lines 161 and 162 and having a one sided bandwidth not exceeding the cutoff frequency of low pass filters 164 and 166. The signals thus generated are amplified by broadband amplifier 124 and fed through the appropriate SAW band pass filter in filter bank 174, to broadband amplifier 120 and to RF switch 116. The baseband signals feeding the two quadrature inputs 161 and 162 are functions of time designated hereinafter as $B_1(t)$ and $B_2(t)$ and are digitally generated by Digital to Analog Converters ("DAC") 168 and 170 respectively, based on the contents of their respective RAM's 171 and 172. Low pass filters 164,166 provide antialiasing filtering as well as out of band harmonic rejection. The clock frequency driving DACs 168,170 and RAMs 171,172 is fed at line 148. This clock signal also advances the RAM address generator 150, causing the appropriate RAM data contents to be loaded sequentially into DACs 168 and 170 respectively. The clock frequency is set so that it is a sufficiently large integral multiple of the fundamental frequency increment 48 between two adjacent channels. For a 6 MHz channel spacing one might select the clock frequency to be 72 MHz, thereby allowing digital generation of baseband signals approaching the Nyquist rate of 36 MHz. With practical low pass filter designs, one can easily generate injection signals for a 9 channel group as shown in FIG. 2.

Referring again to FIG. 1b, it should be noted that during the time interval 30, the amplitude and phase of the injected signals are constant, thereby requiring a CW sinusoidal signal to be injected at each carrier frequency for which additive processing is required. The assumption is made that the local oscillator feeding the quadrature modulator 138 on line 146 is phase locked to a channel group center carrier arriving on line 140 by an Injection Locked Oscillator ("ILO") or Phase Locked Loop ("PLL") oscillator contained in subsystem 142. A further assumption is made that the clock signal on line 148 (72 MHz in this example) is similarly phase locked to a pilot signal arriving on line 140 which is an integral multiple of the fundamental incremental frequency 48 (6 MHz in this example). Due to the linearity of the quadrature modulation process in 138, the required signals $B_1(t)$ and $B_2(t)$ must be each a linear combination of sinusoids with frequencies that are integral multiples of 6 MHz. Hence, during that period of time, $B_1(t)$ and $B_2(t)$ are periodic waveforms with a 6 MHz periodicity, thereby allowing a discrete time representation of each signal with M samples (wherein in the present example M=72 MHz/6 MHz=12). Therefore, the RAM address generator 150 need only repetitively scan through 12 RAM addresses during period 30 in order to generate an arbitrary CW frequency grid at 134. The specific amplitude and phase of the generated injection carriers will depend on the values of the 12 scanned samples in the B1 RAM and the 12 scanned samples in the B2 RAM.

At the RF domain, each generated carrier output on line 134 can be resolved into two quadrature components I and Q. The index k shall be used here to designate the baseband order of the 6 MHz harmonic corresponding to the separation of the specific carrier in question from the center frequency carrier on which the group local oscillator is locked. Thus, for any given k (up to a value of N), there are two sideband components that can be generated, corresponding to two distinct channels. Given their desired quadrature components $I_k^+, Q_k^+, I_k^-$ and $Q_k^-$ represented by a 4 entry column vector, the baseband signals $B_1(t)$ and $B_2(t)$ (represented by a 2 entry column vector for each sample time t) can be shown to be given by the following vector equation:

$$\begin{bmatrix} B_1(t) \\ B_2(t) \end{bmatrix} = \sum_{k=0}^{k=N} \begin{bmatrix} \cos\left(2\pi k \frac{t}{M}\right) & \sin\left(2\pi k \frac{t}{M}\right) & 0 & 0 \\ 0 & 0 & \cos\left(2\pi k \frac{t}{M}\right) & \sin\left(2\pi k \frac{t}{M}\right) \end{bmatrix} \begin{bmatrix} 0 & 1 & 0 & 1 \\ 1 & 0 & -1 & 0 \\ 1 & 0 & 1 & 0 \\ 0 & -1 & 0 & 1 \end{bmatrix} \begin{bmatrix} I_k^- \\ Q_k^- \\ I_k^+ \\ Q_k^+ \end{bmatrix} \quad (1)$$

With an arbitrary RF phase reference coordinate system in Equation (1), $I_k^+$ and $Q_k^+$ correspond respectively to the in-phase and quadrature components of the upper sideband RF injection signals of frequency index k, while $I_k^-$ and $Q_k^-$ correspond to those of the lower sideband of frequency index k. The parameter t is the discrete time variable assuming integer values of 1 through M. In the case k=0, both sidebands degenerate into two halves of a single center carrier, for which Equation (1) reduces to an equation for 2 entry vectors and a 2×2 matrix.

By proper calculations essentially in accordance with Equation (1), based on the required generated values of $I_k^+, Q_k^+, I_k^-$ and $Q_k^-$, the Digital Signal Processor and Micro Controller ("DSP/uC") 152 evaluates the required samples $B_1(t)$ and $B_2(t)$, and stores them in RAMs 171,172 via data bus 154. As indicated above, the injected signals corresponding to the column vector in the extreme right hand side of Equation (1) must be fed in proper phase and amplitude so that when observed on line 109 they match the phasor values of the incoming signals also observed on the same line 109. To this end, the present invention provides for phasor measurement and analysis means that preferably may be comprised of essentially the same apparatus means that effect the coherent injection, namely, digital broadband generator 136, whereby these two functions are time shared in accordance with a predetermined video timing schedule. It is possible to time share and perform measurements during time periods in which no descrambling or RF injection is required. These measurement or phasor analysis periods would preferably be within the VBI, during time intervals in which no active video information is present, therefore providing a fixed received reference for the picture carrier level and phase.

Turning now to these phasor analysis time periods for which no injection is required, an RF switch 116 is set in position 118 and RF switch 126 is turned to position 128. In this way, a sample of the signal to be analyzed on line 109 is fed through a directional tap 110 then amplified by the broadband amplifiers 132, 124 feeding the appropriate filter in filter bank 174. This filtered signal is then further amplified by the broadband amplifiers 120,130 then fed to the quadrature modulator 138 at line 134. It is parenthetically noted that the assumption made here is that the quadrature modulator 138 is reciprocal, that is, that it is constructed from passive devices allowing its internal power combiner to act as a power splitter and that both it's balanced mixers are bidirectional. Under these assumptions, device 138 may also be referred to as a quadrature demodulator, for which the quadrature outputs are on lines 161,162. An example of a reciprocal quadrature modulator 138 that may be employed in accordance with the teaching of the present invention is Model QMC-170 manufactured by the Mini-Circuits corporation of Brooklyn, N.Y. It can be shown that by providing a particular sinusoidal signal pair of a given frequency k at the output of the low pass filters 164 and 166 and feeding them to the mixers of the quadrature demodulator 138 at lines 161, and 162 respectively, double mixing will occur, so that DC components related to the secondary mixing at baseband will result at lines 161, and 162. This operation is essentially that of a double conversion quadrature receiver where the first local oscillator is supplied at line 146 while the second "local oscillators" are supplied in quadrature by pure sinusoidal signals digitally generated by the DACs 168 and 170 through lines 161 and 162. The DC components on these same lines constitute the detected signals coupled through high impedances 176 and 178 to a gated Integrate and Dump ("I&D") circuits 180 and 182, the output of which can then be sampled sequentially using switch 184 that is connected via line 185 to the analog to digital ("A/D") converter 188. The values acquired by the A/D 188 are communicated to the DSP/uC 152 via data bus 190. It should be noted that the output impedance of the low pass filters 164 and 166 should be sufficiently large in order that the DC components generated by the balanced mixers in 138 be measurable. For every frequency k, two independent measurements are performed by setting the RAM contents so that the DACs 168 and 170 generate in the first measurement the values $B_1(t) = a \cos(2\pi kt/M)$ ; $B_2(t) = a \sin(2\pi kt/M)$ and in the second measurement the values $B_1(t) = a \sin(2\pi kt/M)$ ; $B_2(t) = a \cos(2\pi kt/M)$ where a is an appropriate amplitude scale factor adapted to the DACs dynamic range.

The measured scalars obtained in I&D's 180 and 182 during the first measurement (acquired sequentially using both states of switch 184) are designated here by $x_k$, $v_k$ respectively, while those similarly obtained in the second measurement, are designated as $y_k$, $u_k$ respectively. It can be shown that the first measurement corresponds to analysis of the upper sideband, a step hereinafter denoted by AN+, while the second measurement corresponds to an analysis of the lower sideband channel, denoted here by AN−. Hence, four parameters for each frequency k are obtained, thereby enabling the determination of the incoming signal phasors for both the upper (+) and lower (−) sideband channels. These are given by a relation related to the inverse of Equation (1), namely:

$$\begin{bmatrix} AI_k^- \\ AQ_k^- \\ AI_k^+ \\ AQ_k^+ \end{bmatrix} = \frac{1}{2} \begin{bmatrix} 0 & 1 & 1 & 0 \\ 1 & 0 & 0 & -1 \\ 0 & -1 & 1 & 0 \\ 1 & 0 & 0 & 1 \end{bmatrix} \begin{bmatrix} x_k \\ y_k \\ u_k \\ v_k \end{bmatrix} \quad (2)$$

The phasor values obtained in Equation (2) during the measurement periods AN+ and AN−, hereinafter termed analysis periods, are used by the DSP/uC 152 for computing and adjusting the content of RAMs 171 and 172 for the injection period in a manner to be further discussed below, so as to provide for the precise phase and amplitude relationship required of the injected signals during the HBI based on the received phasor analysis. For the center carrier analysis (k=0), the system degenerates into a single conversion receiver, in which one applies 0 values for $B_1(t)$ and $B_2(t)$ and with a single measurement, one directly obtains the two quadrature component estimates at the I&D's 180 and 182 outputs.

In order to perform the injection and analysis in coordination with the group video timing, a vertical frame reference data sequence is inserted in the VBI of all, or at least one, of the channels within the group. The apparatus of FIG. 3 provides for vertical frame synchronization by the use of data matched filter 194 and sync and data detector 196, resetting the timing chain circuitry 210 via sync detect line 202. The timing chain circuitry 210 provides all timing signals (t1 to t7) controlling the RF switches, the I&D's and the A/D strobe. The address generator 150 is provided with the proper reset and preload signals from the timing chain circuit 210 so as to scan the proper RAM memory locations containing the appropriate data records for the synthesis of the injection signals and the analysis signals as required. As explained above, based on the reciprocity property of the broadband generator 136, it also serves as a broadband quadrature synchronous receiver which is used for phasor analysis and data and sync acquisition on selected channels. A particular channel can therefore be received by the additive combination of the quadrature signals at 161 and 162 via the summing resistors 193 and 192 that are connected to the matched filter 194. The channel that is being received can be determined by the proper choice of the sinusoidal components being generated by the DAC pair 168,170 so that the appropriate sinusoids are applied in quadrature at 161 and 162 respectively, essentially in the same manner as that described for the analysis measurements AN+ or AN−, depending whether an upper side or lower side channel is being received. For example, if data in the VBI of an upper sided channel corresponding to frequency index k is being received, the RAM values of $B_1(t)$ and $B_2(t)$ are set to $$B_1(t) = a\cos\left(\frac{2\pi kt}{M} + \theta\right);$$

$$B_2(t) = a\sin\left(\frac{2\pi kt}{M} + \theta\right);$$

where $\theta$ is the phase angle required to receive this channel in-phase based on the measured components $AI_k^+$ and $AQ_k^+$. It can be shown that the above trigonometric expressions for the RAM values required in the receive mode, correspond to the values which would be obtained according to Equation (1) with only one term in the sum (corresponding to frequency index k), wherein $I_k^-$ and $Q_k^-$ are set to zero. Stated another way, the RAM contents required in order to receive a selected channel is the same as that which is required to generate a single carrier, in-phase coherence with that channel's received carrier.

With the proper RAM signals set as described above, data inserted in the VBI of any channel within the group can be selectively detected by the matched filter 194 and the data detector 196. This detected data stream is used to address the subscriber units in a manner known in the art of addressable subscription control. The identity of the specific channels authorized for descrambling and those denied from each subscriber will then be communicated to the microcontroller section of 152 of each subscriber. Based on this subscription configuration information, the DSP/uC portion of 152 calculates the specific linear combination required for $B_1(t)$ and $B_2(t)$ in accordance with Equation (1) for each frequency k.

To see this in the specific example of FIG. 2, one first designates the lower sided channel corresponding to frequency index k as "−K" and the upper sided channel of that frequency index as "+K". Accordingly, note that FIG. 2 contains nine channels with the designations −4,−3,−2,−1, 0,+,+2,+3,+4. Given this channel designation method, FIG. 2b indicates a specific subscription configuration which calls for DESCRAMBLING (in phase injection) of Channels −3,−1 and +3, shown as injected signals 50, and further DENIAL (out-of-phase injection) of Channels −2 and +2, shown as injected signals 52 and finally NO PROCESSING (no injection) on Channels −4,0, +1 and +4, shown at 54. It is assumed that the values of $AI_k^+, AQ_k^+, AI_k^-$ and $AQ_k^-$ for the channels in need of injection have been obtained by the Analysis measurement sessions AN+ and AN− as described above and in accordance with Equation (2). Based on this subscription configuration, the following vector entries should be used for each k in the right hand side of Equation (1) in order to generate the required subscription configuration of FIG. 2:

$$k = 0: \begin{bmatrix} 0 \\ 0 \\ 0 \\ 0 \end{bmatrix};$$

$$k = 1: \begin{bmatrix} d \cdot AI_1^- \\ d \cdot AQ_1^- \\ 0 \\ 0 \end{bmatrix};$$

$$k = 2: \begin{bmatrix} -g \cdot AI_2^- \\ -g \cdot AQ_2^- \\ -g \cdot AI_2^+ \\ -g \cdot AQ_2^+ \end{bmatrix};$$

$$k=3: \begin{bmatrix} d \cdot AI_3^- \\ d \cdot AQ_3^- \\ d \cdot AI_3^+ \\ d \cdot AQ_3^+ \end{bmatrix};$$

$$k=4: \begin{bmatrix} 0 \\ 0 \\ 0 \\ 0 \end{bmatrix}$$

where d and g are appropriate positive scale factors relating the relative magnitude of the measured carrier during the analysis period and the injection phasor magnitudes required for descrambling and out-of-phase injection denial respectively.

As recalled from a previous discussion, the injected signals must be VSB modulated. This can be accomplished by providing digital samples to DACs 168 and 170 in accordance with digitally precalculated sequences which specifically yield injection pulses onset and terminations with VSB spectra. For a single carrier systems, there exists known methods of providing two quadrature components with certain relationships that yield a VSB modulated signal. A discussion of such methods can be found in the book entitled *Principles of Data Communications* by R. Lucky, J. Salz and E. J. Weldon published by McGraw-Hill, New York 1968. It can be mathematically shown that two such signals used for quadrature modulation of a carrier yielding a desired VSB pulse shaping are given by C(t) and S(t) shown in FIG. 4 wherein C(t) is the modulating function of the in-phase component and S(t) is that of the quadrature component. Recall that the case of CW injection 30 of FIG. 1b is characterized by a time invariant column phasor vector on the right hand side of Equation (1). Thus, for the inclusion of VSB transitions 32,33, the time invariant phasor column in Equation (1) must be replaced by the time varying vector $R_k(t)$ given by:

$$R_k(t) = \begin{bmatrix} C(t) & S(t) & 0 & 0 \\ -S(t) & C(t) & 0 & 0 \\ 0 & 0 & C(t) & S(t) \\ 0 & 0 & -S(t) & C(t) \end{bmatrix} \begin{bmatrix} I_k^- \\ Q_k^- \\ I_k^+ \\ Q_k^+ \end{bmatrix} \quad (3)$$

Since this expression is used in Equation (1) for each frequency k, and since C(t) and S(t) are not periodic functions, generally, the values of $B_1(t)$ and $B_2(t)$ will not be periodic in 12 samples, but rather a longer data record will be required for the synthesis of these spectrally shaped signals. Hence, with an appropriately increased value for the sample number M, and the numerical values for the functions C(t) and S(t) stored in a ROM inside the DSP/uC 152, the RAM record values $B_1(t)$ and $B_2(t)$ are calculated by the DSP/uC 152 in accordance with Equation (1-A):

It should be further noted that a multiplicity of incrementally spaced VSB signals similar to those in FIG. 2b would thus be generated on line 134. If, for example, N=4, Equation (1-A) will yield 9 independent VSB modulated phasors generated with nominal phasor values determined by the selected phasor injection values for $I_k^+, Q_k^+, I_k^-$ and $Q_k^-$ in Equation (3), with k=0,1,2,3,4. These phasor values will be set in accordance with the desired processing action on each channel, based on the subscriber's subscription status.

Figure 4:
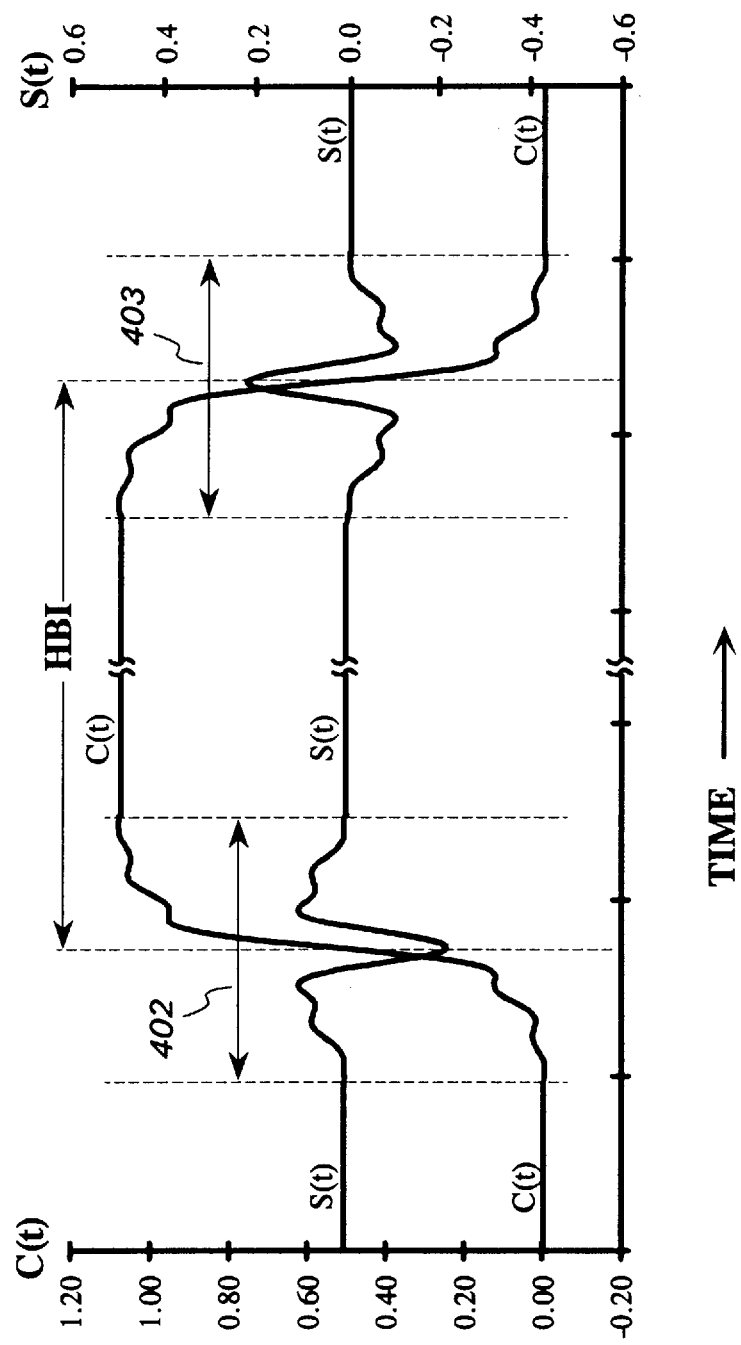
FIG. 4 is a plot of two baseband quadrature components required for VSB spectral shaping of the injected signals used for multichannel descrambling in accordance with the present invention.
Figure 5:
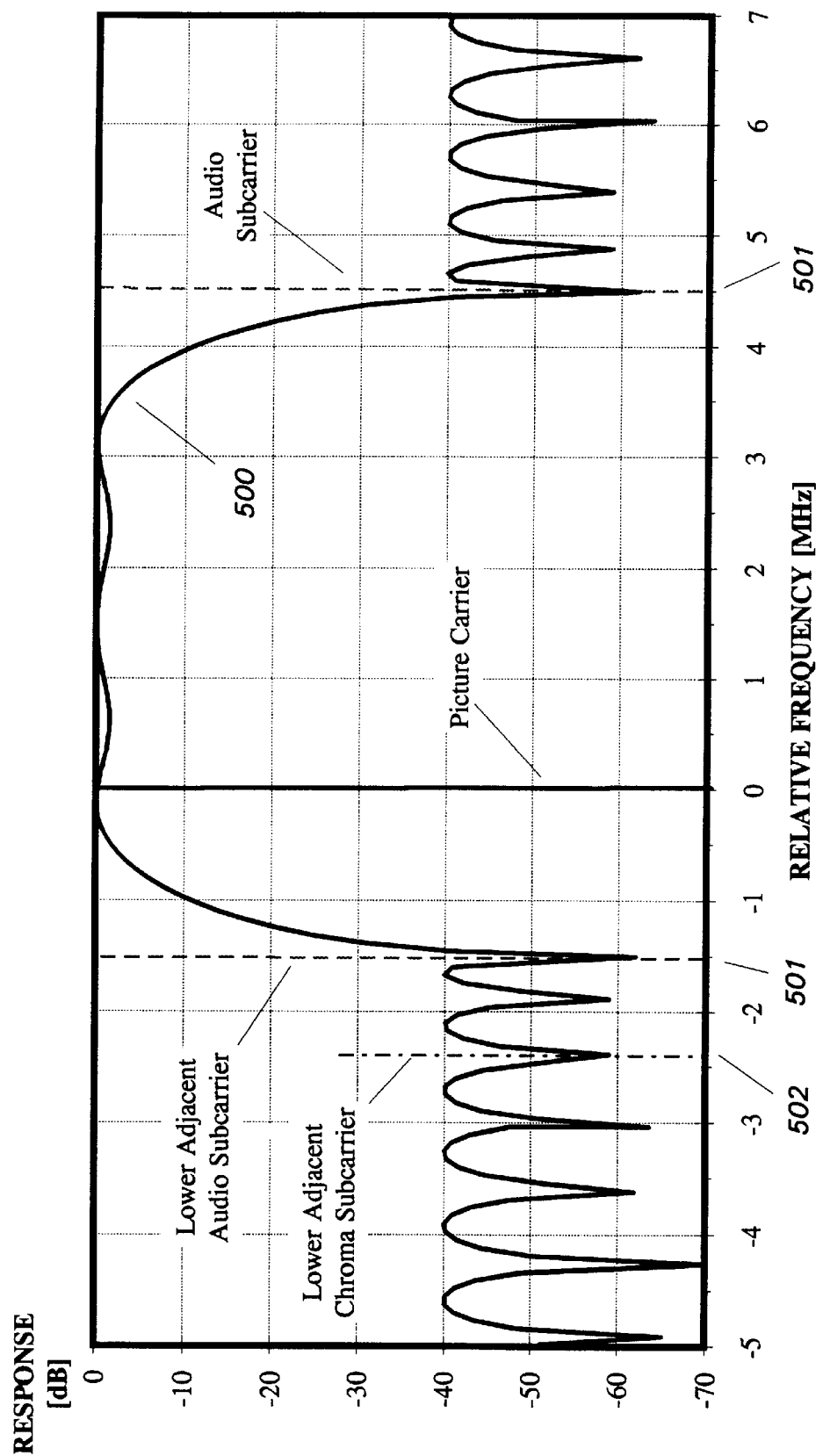
FIG. 5 is the computational digital filter used to generate the quadrature components of FIG. 4.

There exists a tradeoff between the RAM record length required for representing transients 32 and 33 of FIG. 1b and the equivalent channel passband frequency response and transition bandwidths of the VSB spectra. In the example of the first preferred embodiment of the present invention, the transition intervals 402 and 403 in FIG. 4, each correspond to a record length of 109 samples at 72 MSps for each of records 32 and 33 respectively. FIG. 5 depicts the frequency response 500 of an equivalent digital filter that was computationaly applied to a square modulated pulse from which the baseband quadrature functions C(t) and S(t) shown in FIG. 4 are derived. As can be seen in FIG. 5, one can achieve an acceptable VSB spectral shaping about the picture carrier with this relatively short sample sequence. Another feature provided by the digital signal processing capability of the present invention is the ability to design the functions C(t) and S(t) based on a precise computational digital filter of FIG. 5, wherein specific spectral nulls are provided around the audio subcarrier frequencies 501, thereby ensuring that the broadband injected VSB signals do not interfere with the audio portion of the signals. These strong attenuation features will in general not be required on frequencies which only affect the video portion of adjacent channels, since the resultant crosstalk effects are video frame synchronous for a contiguous group of channels and thus introduce only small transient artifacts at the edges of the HBI which are unviewable. Referring again to FIG. 5, a specific provision for a spectral null at the chroma subcarrier frequency 502 of the lower adjacent channel is made so as to minimize chroma interference to the lower adjacent channel bordering the frame synchronous group of channels, should it's video timing be horizontally shifted in accordance with a video staggering method to be explained below.

Summarizing the discussions above, it is this specific ability of generating multichannel signals with essentially arbitrary amplitude and phase in video synchrony and RF coherence with incoming signals that allows one to provide simultaneous processing of a group of channels.

Figure 6A:
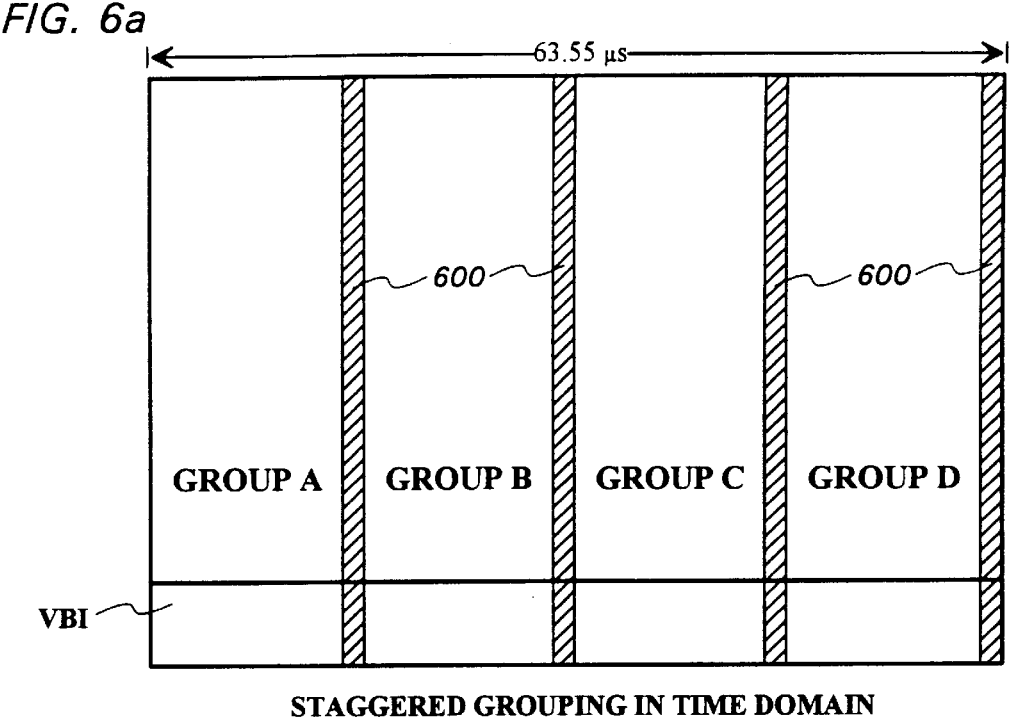
FIG. 6a describes the broadband coverage by channel group time sharing of the injected signals of the present invention.
Figure 6B:
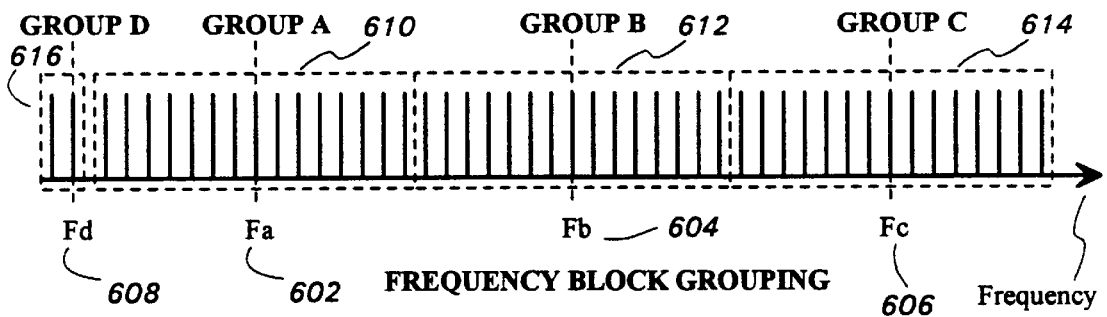
FIG. 6b is the frequency spectrum partitioning by channel block grouping.
Figure 6C:
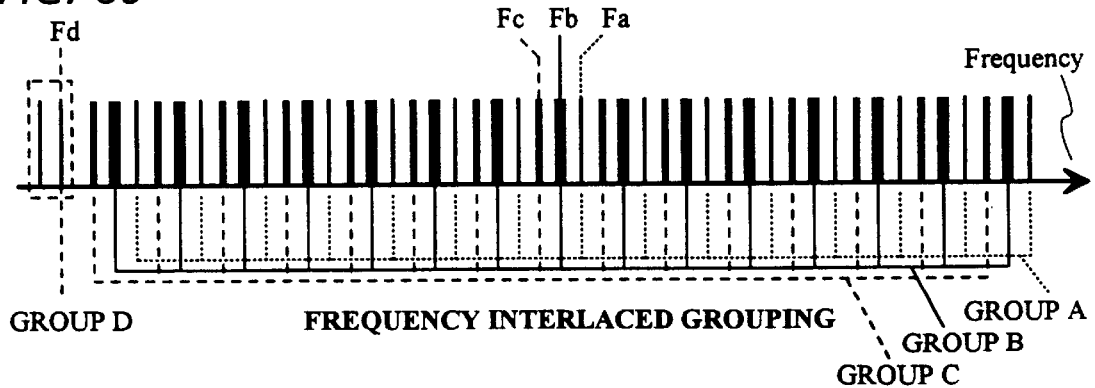
FIG. 6c is the frequency spectrum partitioning by frequency interlaced grouping.

Because of practical limitations such as DAC clock rates and DAC dynamic range and linearity, the number of channels that can simultaneously and accurately be generated in the broadband generator 136 of FIG. 3 is limited. It is therefore desirable to be able to use the broadband generator 136 in a timesharing mode, whereupon several channel groups may be processed sequentially, thereby increasing the total number of channels processed by switching the local oscillators feeding the broadband generator 136 to the center frequency channels of each group. This operation mode is generally possible in this video application $$\begin{bmatrix} B_1(t) \\ B_2(t) \end{bmatrix} = \sum_{k=0}^{k=N} \begin{bmatrix} \cos\left(2\pi k \frac{t}{M}\right) & \sin\left(2\pi k \frac{t}{M}\right) & 0 & 0 \\ 0 & 0 & \cos\left(2\pi k \frac{t}{M}\right) & \sin\left(2\pi k \frac{t}{M}\right) \end{bmatrix} \begin{bmatrix} 0 & 1 & 0 & 1 \\ 1 & 0 & -1 & 0 \\ 1 & 0 & 1 & 0 \\ 0 & -1 & 0 & 1 \end{bmatrix} \begin{bmatrix} \cdot \\ \cdot \\ R_k(t) \\ \cdot \\ \cdot \end{bmatrix} \quad (1\text{-}A)$$

since the required processing (and injection) time per line is limited to the HBI which is less than one forth of the total horizontal line time. Thus, at the headend, groups of channels are video synchronized in a staggered manner so that their HBI do not overlap. This is shown schematically in FIG. 6a. Time intervals 600 provide a guard interval, during which no injection is required, for switching the center carrier local oscillators among the four channel groups A through D (switch 144 in FIG. 3) and the appropriate group band pass filter in filter bank 174 using switch 122. Two possible frequency arrangements for channel assignments for each group are shown in FIGS. 6b and 6c. The first preferred embodiment of FIG. 3 utilizes the frequency block grouping of FIG. 6b, since it requires lower DAC speeds for the same number of channels per group. However, at the expense of faster DACs and RAMs, the frequency interlaced grouping of FIG. 6c offers potential savings in the filter bank, since in this case only a single (and wider) harmonic filter is required. In the preferred embodiment of channel frequency grouping of FIG. 6b, the local oscillator of frequency Fa 602 is selected by switch 144 during the interval labeled as GROUP A in FIG. 6a. Subsequently, switch 144 is similarly moved to select the local oscillator corresponding to the center channel of channel GROUP B, at frequency Fb 604 and so on for groups C and D, to fill out the rest of the horizontal video time, sequentially dwelling on frequencies Fc 606 and Fd 608 for equal periods of time corresponding to the HBI duration. In this manner, the same broadband generator performs the required processing for each channel in the four groups by coherent injection during the HBI of every channel.

Figure 7:
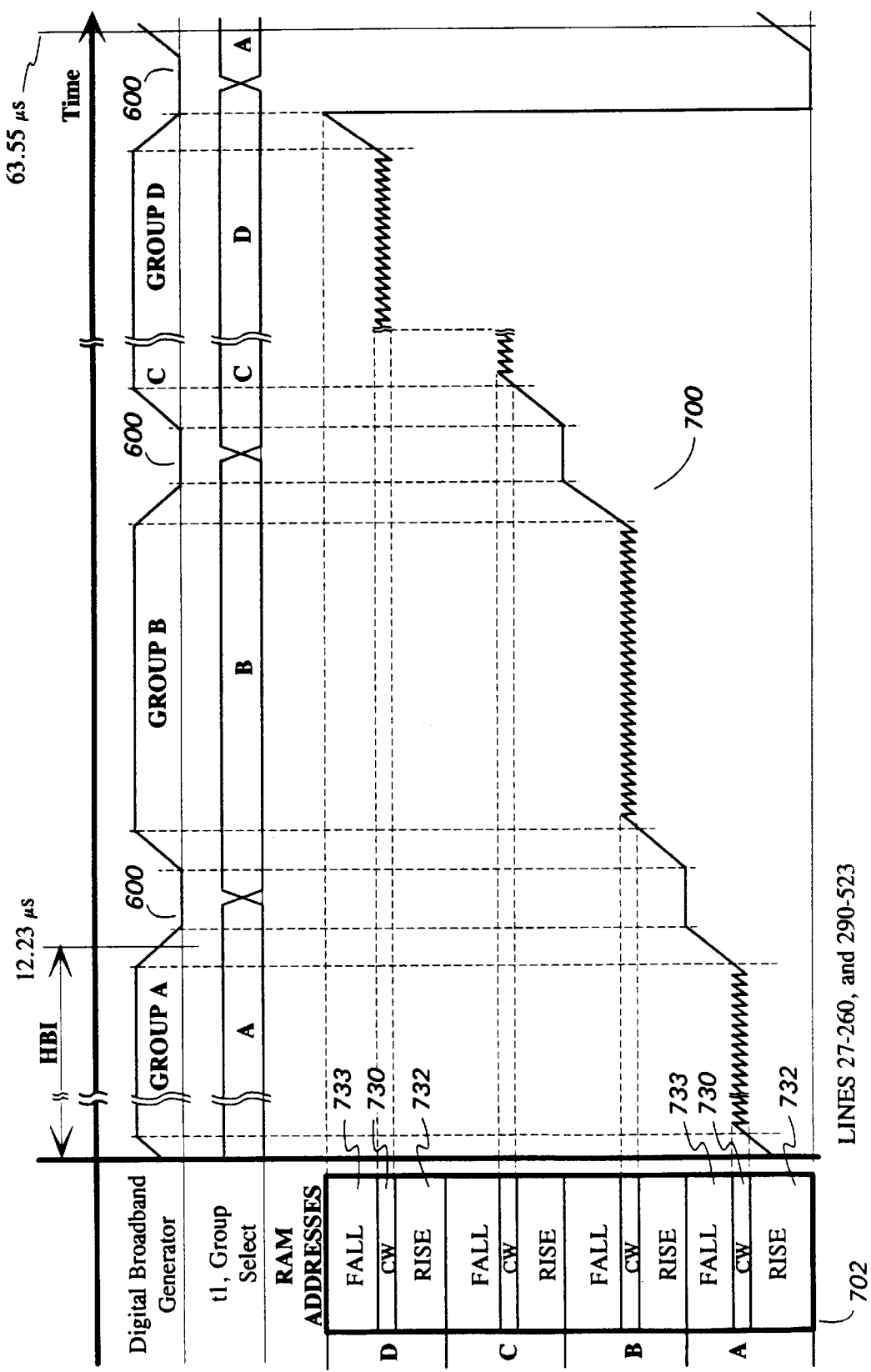
FIG. 7 is the timing diagram of coherent injection groups and their respective RAM address schedule.

FIG. 7 shows the method of digital generation of the injected waveforms during one horizontal video line for all channel groups. As can be seen, in each channel group period, there are three RAM segments each corresponding to sequence of samples required for the respective time segments 32,30,33 of FIG. 1b. The address value schedule generated by the address generator 150 is shown by 700. The RAM address value at each time is shown on the vertical axis range 702. It is generated by the address generator 150 and supplied to B1 and B2 RAMs 171 and 172 simultaneously via RAM address bus 156. The address generator 150 is advanced by the clock signal on line 148, said clock signal frequency is preferably an integral multiple of the channel incremental frequency which is 6 MHz in North America. Hence, in the example of the present invention the clock frequency is 72 MHz.

The numerical values stored in B1 and B2 RAMs, that are fed to DACs 168 and 170, are prepared by the DSP/uC 152 based on calculations specified in Equation (1-A) for each channel group, thus filling in the values in the RAM VSB "rise" section 732, CW section 730 and VSB "fall" section 733 for channel GROUP A and similarly for the other three groups.

Turning to the first embodiment of the present invention, the system of FIG. 3 maintains its injection and analysis waveforms in a fixed phase and amplitude relationship to the incoming signals by closing a phasor control loop for each processed channel by making successive analysis and corrections, thereby tracking any slow relative phase or amplitude drifts in the CATV distribution system or any of the components in the subscriber unit such as power splitter 102, directional coupler 108 or the broadband amplifier 104 or any of the components within the broadband generator 136 which may affect the relative injected phasors as compared to the incoming channel phasors.

Figure 8:
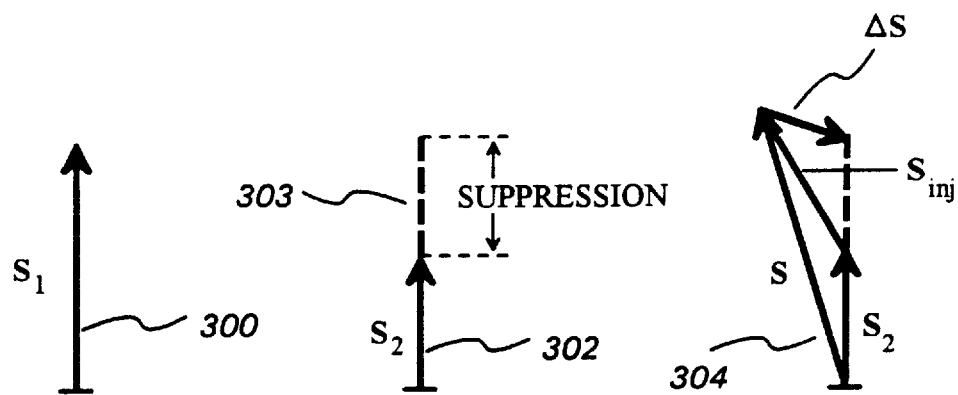
FIG. 8 is a phasor diagram describing the received signals and the injected signals.

In order to better understand the phasor tracking and calibration method of the present invention, reference is made to FIG. 8. It is assumed that the phasor diagrams in FIG. 8 correspond to phasors observed on line 109 using the analysis method discussed above for an arbitrary channel within the controllable channel group. $S_1$, phasor 300, represents the picture carrier phasor of an incoming carrier with black level transmission of 0 IRE during a line portion of the VBI for which no injection is required. At this point, an analysis period can be commenced to yield an estimate of the phasor $S_1$. If one assumes that the sync signal is suppressed by a baseband equivalent shift of 70 IRE, one may wish to measure a portion of the signal that provides identical suppression but at a line portion which does not require reconstruction by injection, hence making available the broadband generator as a phasor analyzer. This may be done by modifying the video signal at the headend to have a 70 IRE gray pedestal in a line portion of the VBI which otherwise would be at 0 IRE blanking level. This situation is depicted by $S_2$, (phasor 302) suppressed by the 70 IRE pedestal corresponding to an RF amplitude amount 303. In theory, an analysis of $S_1$ and $S_2$ should suffice to determine their phasor difference so that it may be generated and injected by the broadband generator 136. The difficulty with this approach stems from the fact that the signal paths for the measured signals and the injected signals are unequal and thus no direct measurement of the injected phasor as it is imparted on line 109 is available. This primarily stems from the fact that during the injection period, the generator must generate a plurality of signals which cannot be useful for phasor analysis and vice versa. That is, only one function can be achieved at a time. It would be preferable to measure S, the combination of the incoming phasor $S_2$ and the injected phasor $S_{inj}$ which would then be compared to $S_1$. Using these two measurements, one then derives the error phasor $\Delta S$ based on the vector equation $$\Delta S = S_1 - S \quad (4)$$

From the above equation, a phasor increment is calculated by DSP/uC 152 and accumulated so as to modify the RAM records for injection. This process is constructed iteratively so convergence to phasor matching is effected.

Figure 9:
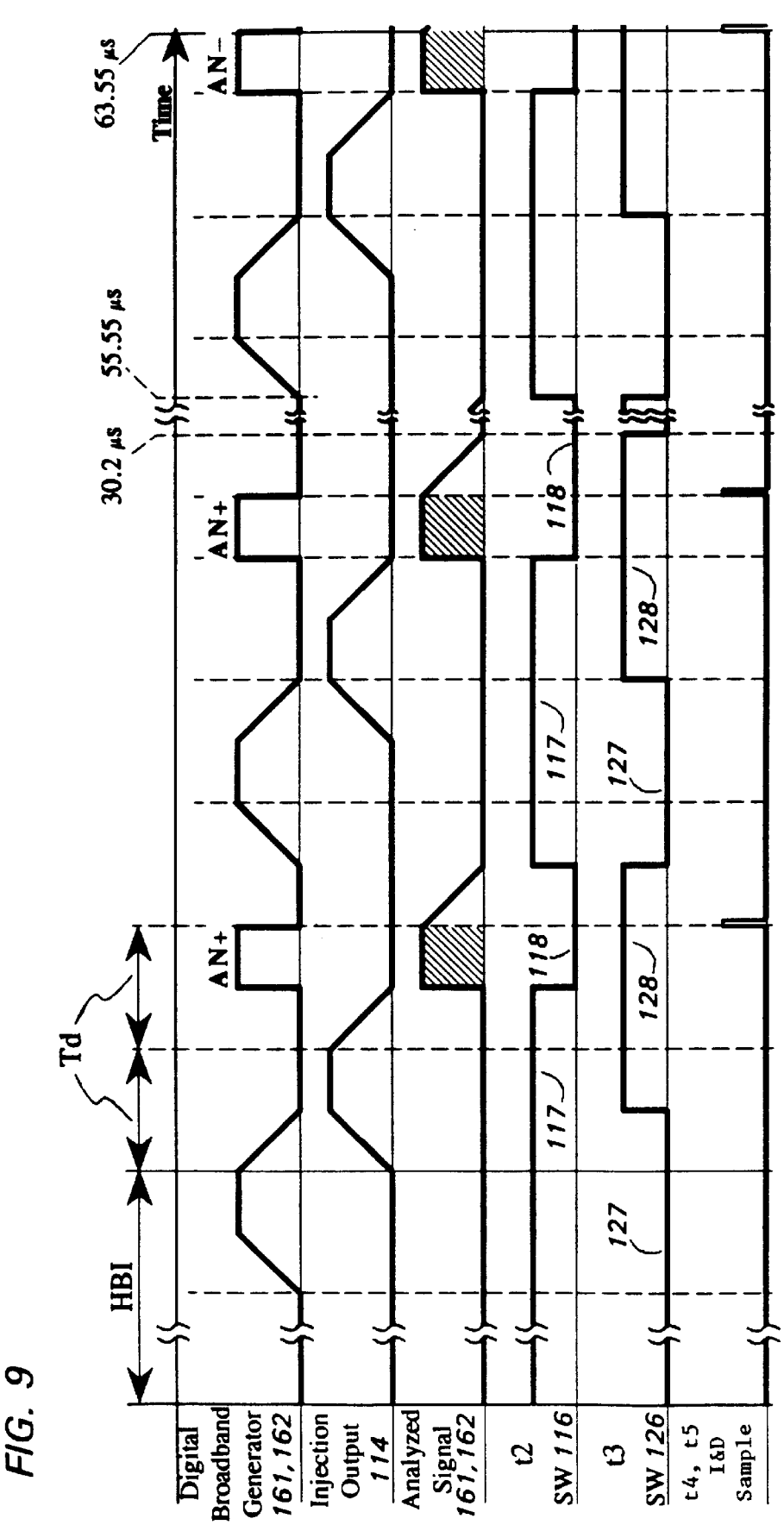
FIG. 9 is an active calibration and analysis timing diagram in the preferred embodiment of the present invention.
Figure 10:
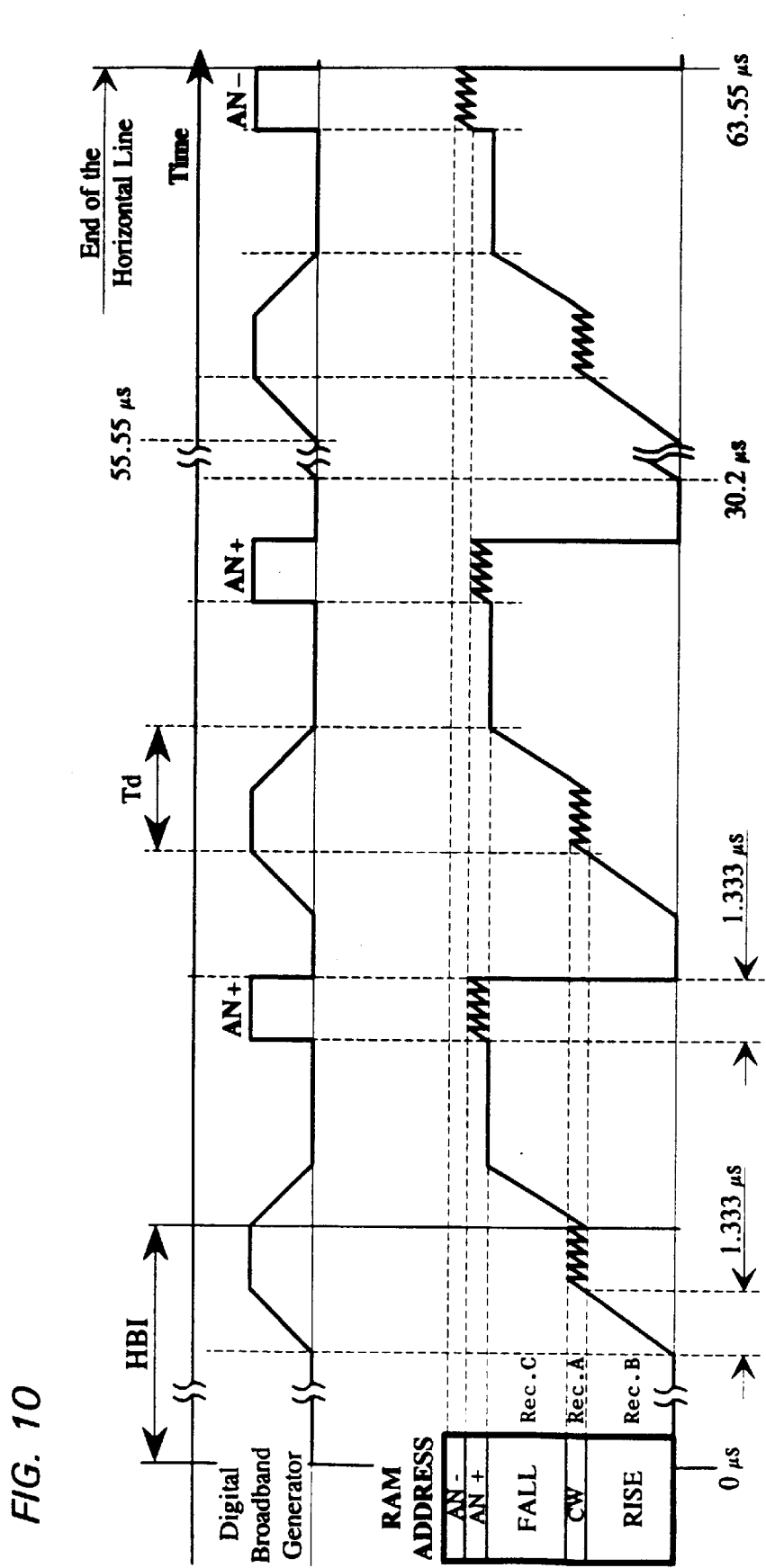
FIG. 10 is another active calibration and analysis timing diagram including RAM address space trajectory.
Figure 11:
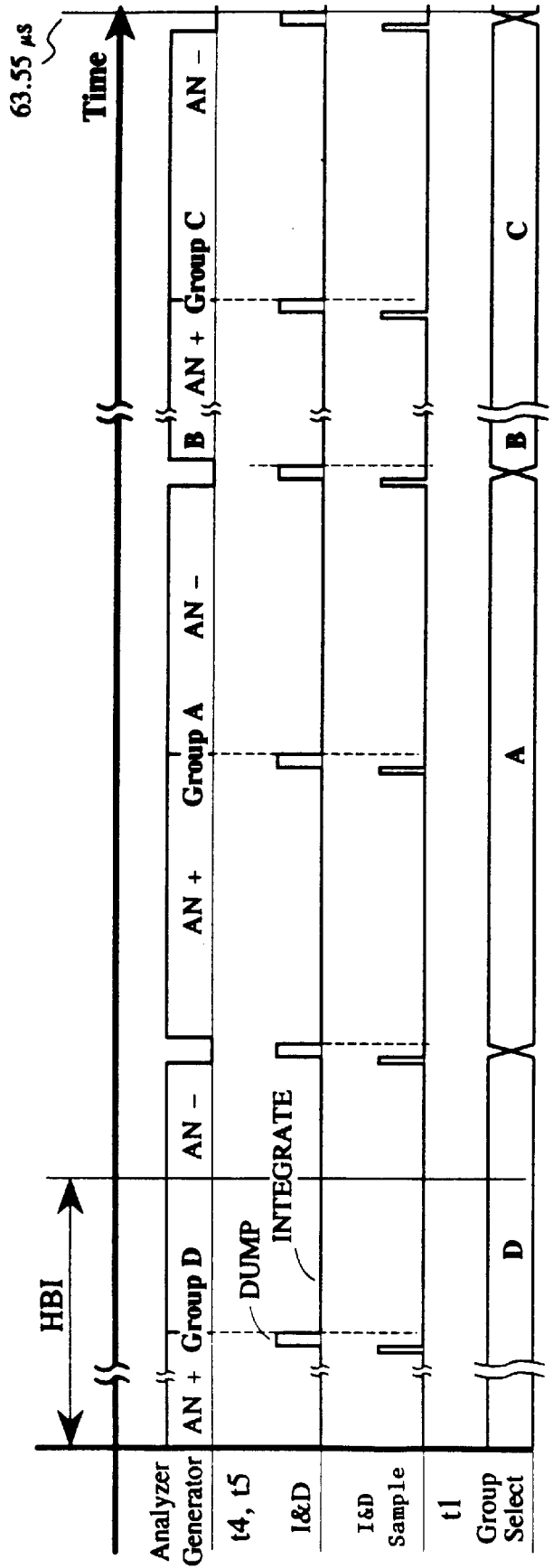
FIG. 11 is an analysis and measurement timing diagram describing the phasor tracking mechanism.

The assumption made above regarding the measurability of S is that both an injection and analysis sources exist simultaneously. It is possible to obtain a measure for S in a sequential manner by taking advantage of sufficient SAW filter delay in filter bank 174. The method is based on an injection of the required composite RF signal during a short pulse and the subsequent reception of the delayed version of the pulse while the broadband generator becomes an analyzer. This is done by manipulating RF switches 116 and 126 during a fill line of the VBI wherein a 70 IRE pedestal is inserted at the headend. In the first preferred embodiment, such calibration and analysis is performed during video lines 17 and 280. FIG. 9 shows the pulsed injection and analysis timing as well as the state schedule of RF switches 116 and 126. FIG. 10 shows the related RAM addressing schedule in which injection sectors designated by Rec. A,B,C and analysis sectors AN+ and AN− are periodically alternating through the control of the address generator 150. The samples obtained by the A/D 188 in this process may be averaged in the DSP/uC 152 in order to provide additional precision for the phasor estimates thus derived. The procedure described above can be employed sequentially on all channels for which injection is required.

The above paragraph described the measurement of the combined phasor S of FIG. 8. In order to perform the adjustment in accordance with Equation (4), $S_1$ may be obtained freely during much of the 0 IRE blanking level of the VBI. In this case, multiple channels and groups can be processed within one VBI frame. This is simply done by subjecting the system to sequential CW analysis sessions AN+ and AN− as shown for multiple groups in FIG. 11.

Figure 12:
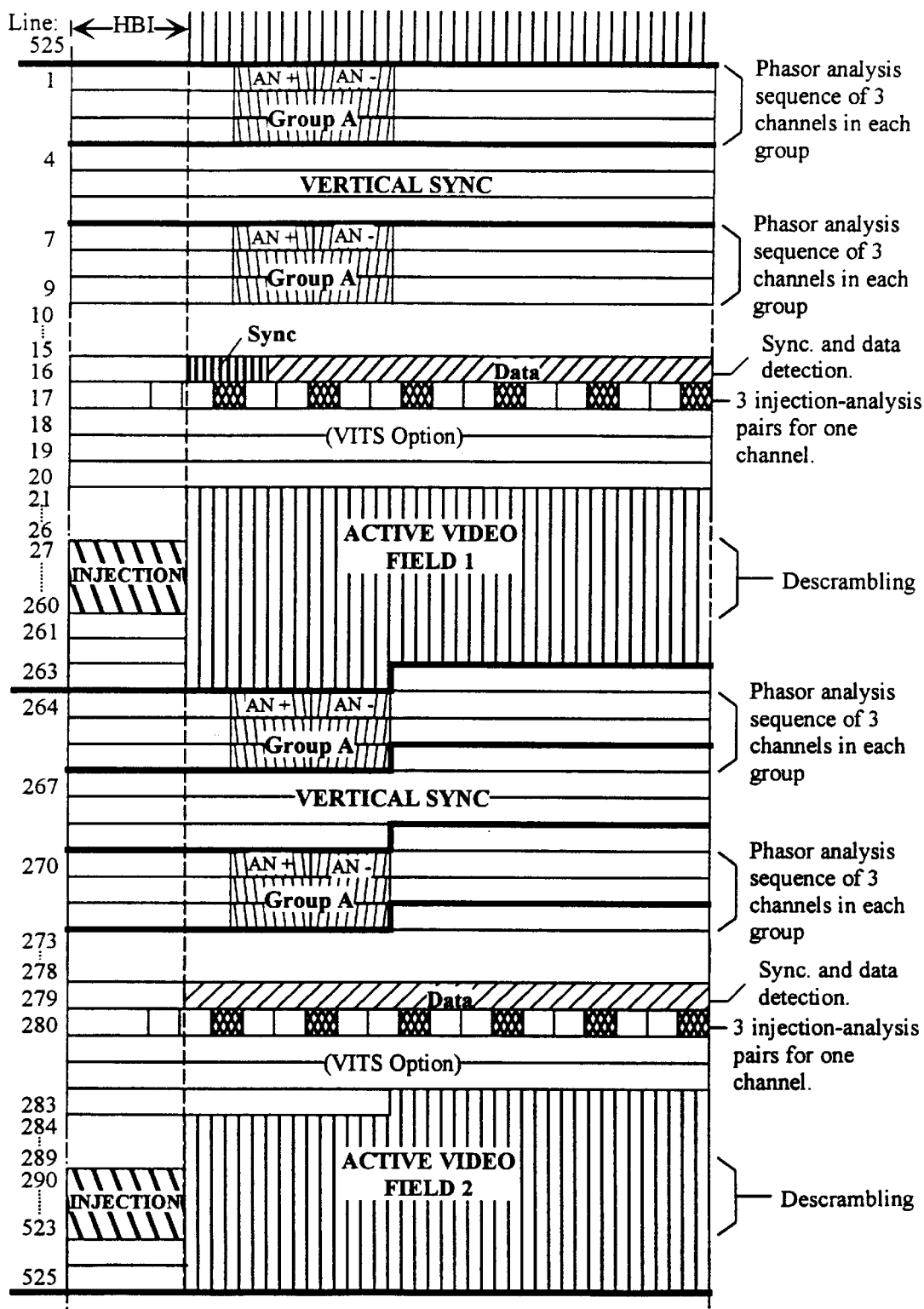
FIG. 12 is an overall video timing diagram describing pertinent events and processes utilized in the present invention.

The overall video timing schedule of the first embodiment of the present invention is shown in FIG. 12. As can be seen, the periods for injection, analysis, sync and data detection are non-overlapping and thus provide an efficient use of the broadband generator. Upon completion of each video field or frame, correction to all injected phasors can be made in accordance with increments AS yielding for all frequencies the following increments for $B_1(t)$ and $B_2(t)$:

$$\begin{bmatrix} \Delta B_1(t) \\ \Delta B_2(t) \end{bmatrix} = \sum_{k=0}^{k=N} \begin{bmatrix} \cos\left(2\pi k \frac{t}{M}\right) & \sin\left(2\pi k \frac{t}{M}\right) & 0 & 0 \\ 0 & 0 & \cos\left(2\pi k \frac{t}{M}\right) & \sin\left(2\pi k \frac{t}{M}\right) \end{bmatrix} \begin{bmatrix} 0 & 1 & 0 & 1 \\ 1 & 0 & -1 & 0 \\ 1 & 0 & 1 & 0 \\ 0 & -1 & 0 & 1 \end{bmatrix} \begin{bmatrix} \Delta I_k^- \\ \Delta Q_k^- \\ \Delta I_k^+ \\ \Delta Q_k^+ \end{bmatrix} \quad (5)$$

Figure 13A:
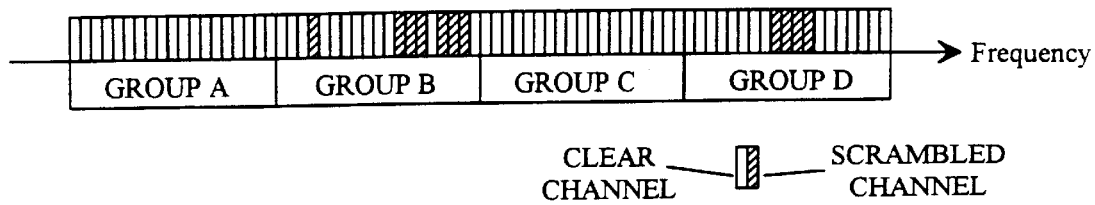
FIG. 13 is an example of a CATV head end configuration desired for the practice of the present invention.
Figure 13B:
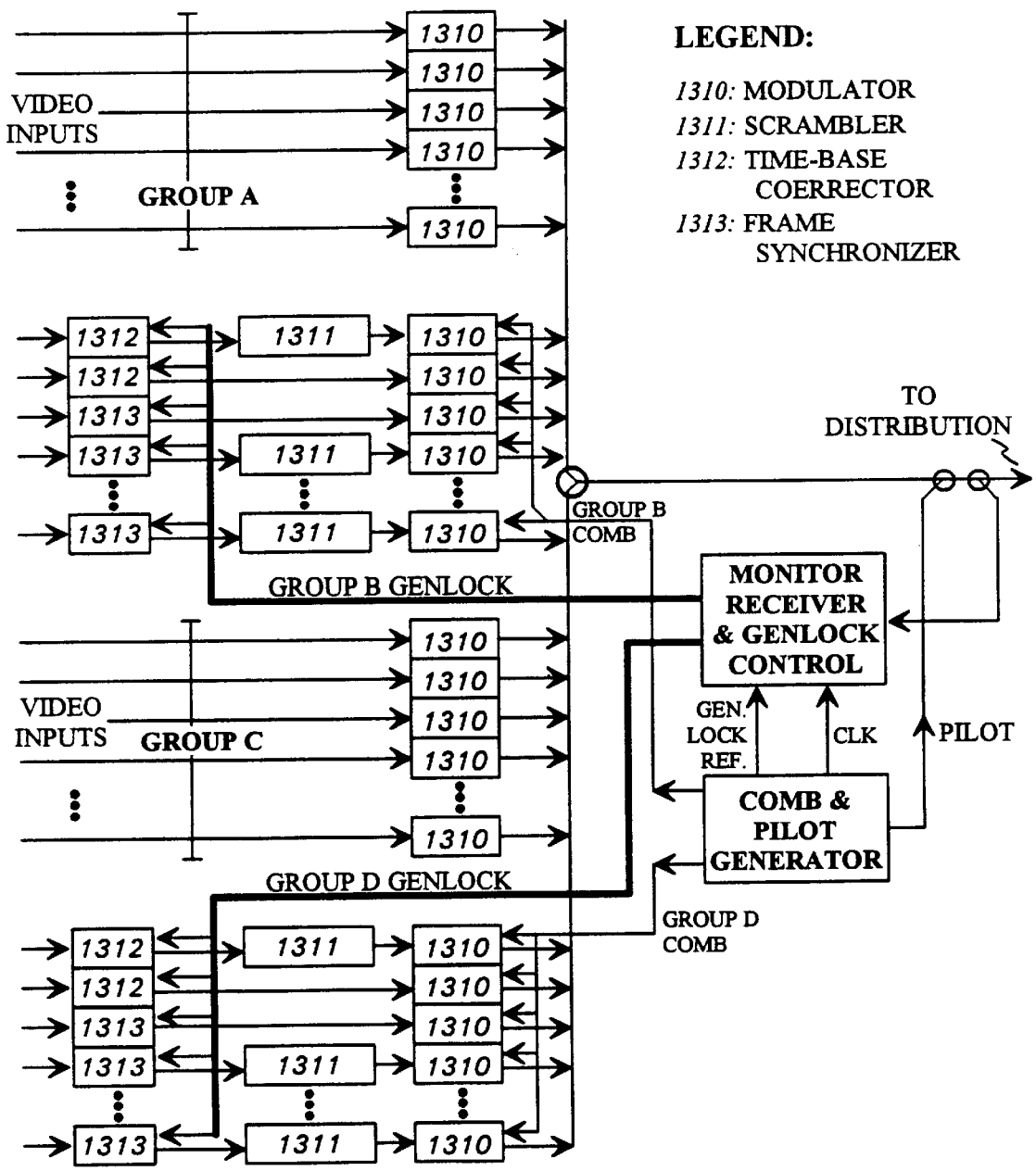
Figure 14:
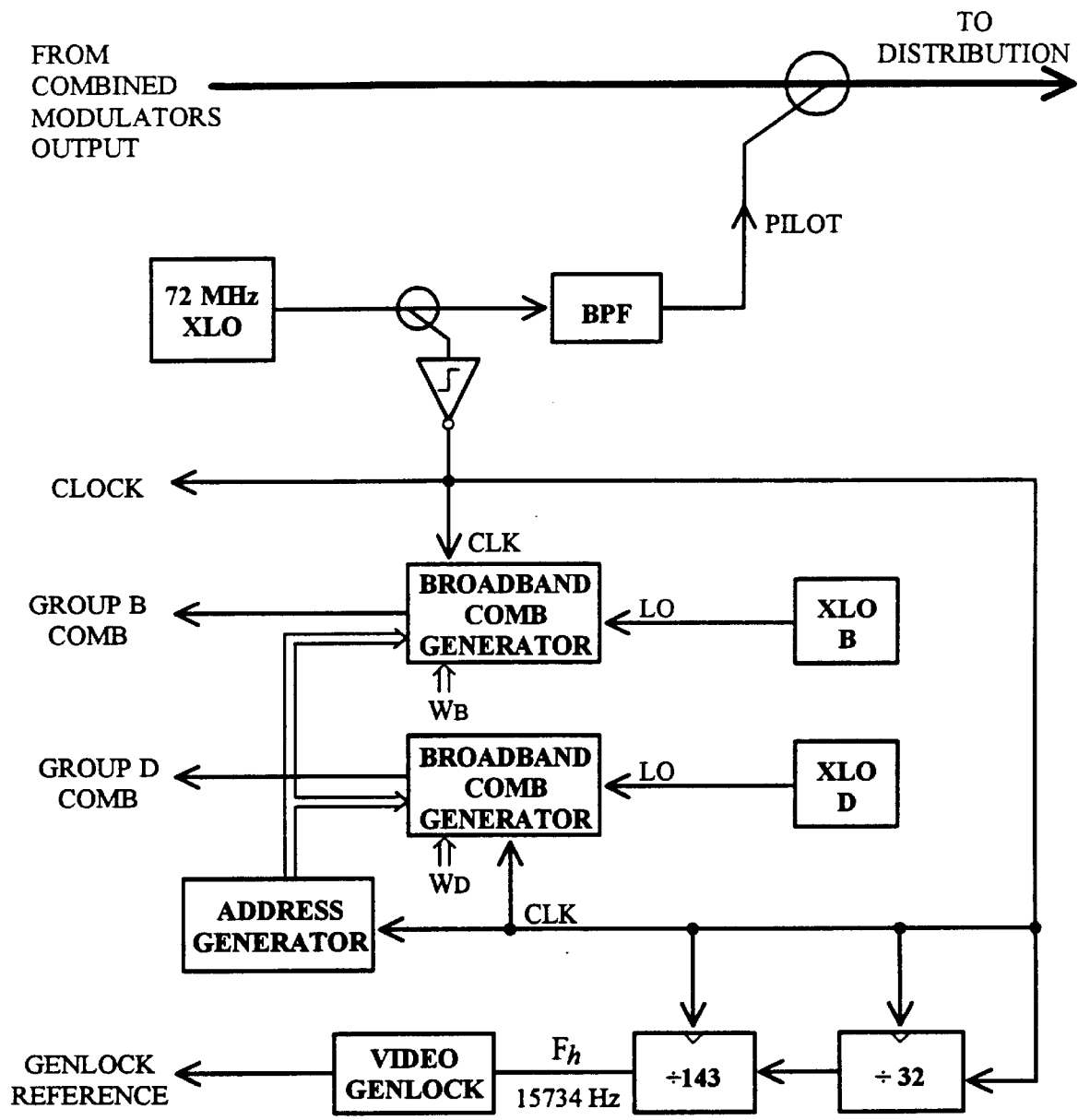
FIG. 14 is a further detail of the comb generator system utilized at the headend.

FIG. 13 provides a schematic diagram of a CATV headend configured in accordance with the present invention in which only two groups of channels (groups B and D) contain scrambled channels to be processed by the subscriber unit of FIG. 3. A comb generator supplies independent comb signals to each group, thereby allowing partial IRC operation. A more detailed view of the comb generator is provided in FIG. 14. The two broadband comb generators feeding group B comb and group D comb are of similar construction to the subscriber broadband generator 136. However, here, all carriers are constructed in a CW periodic mode. Thus, for a 72 MHz clock frequency, the address generator is essentially a modulo 12 counter providing the 6 MHz periodicity. The 72 MHz pilot signal is also fed into the CATV system in order to provide all subscriber units with synchronous clock. Note also that the master video timing supplied by the genlock reference signal is locked to the 72 MHz clock, thereby guaranteeing the rigid relationship between line rate and RF clock rate that eliminates the need to change the RF RAM records for every video line at the subscriber unit. The relative phases of the comb signals may be changed by downloading other RAM records through data buses $W_B$ and $W_D$. These phase values are practically irrelevant to the operation of the system of the present invention but it may be desirable to adjust them in order to reduce total transmission distortion as disclosed in the above cited U.S. Patent to the present inventor.

Figure 15A:
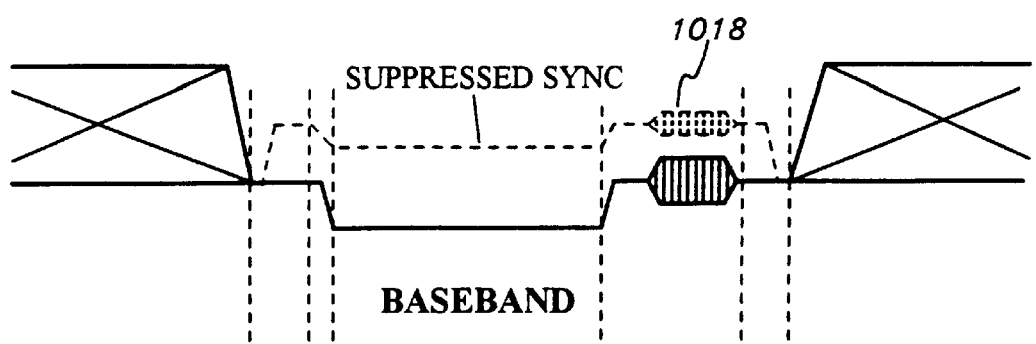
FIG. 15a is a baseband representation of an RF sync suppression waveform.
Figure 15B:
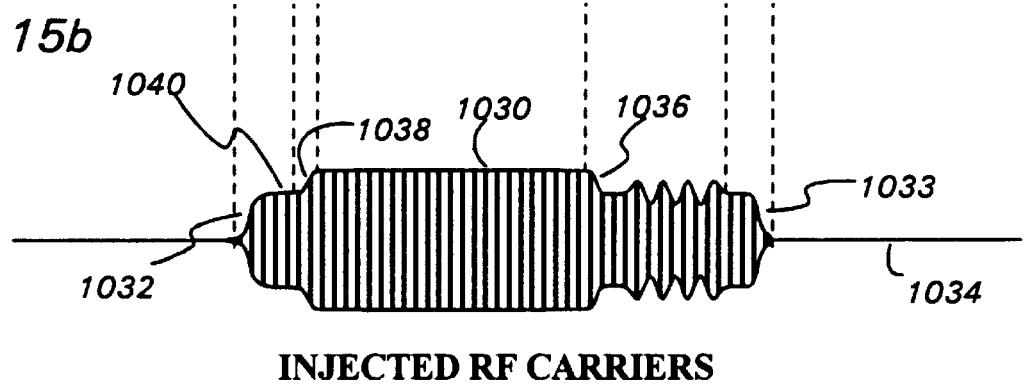
FIG. 15b is the coherent RF injected signal for descrambling the signal of FIG. 15a in accordance with the present invention.
Figure 16:
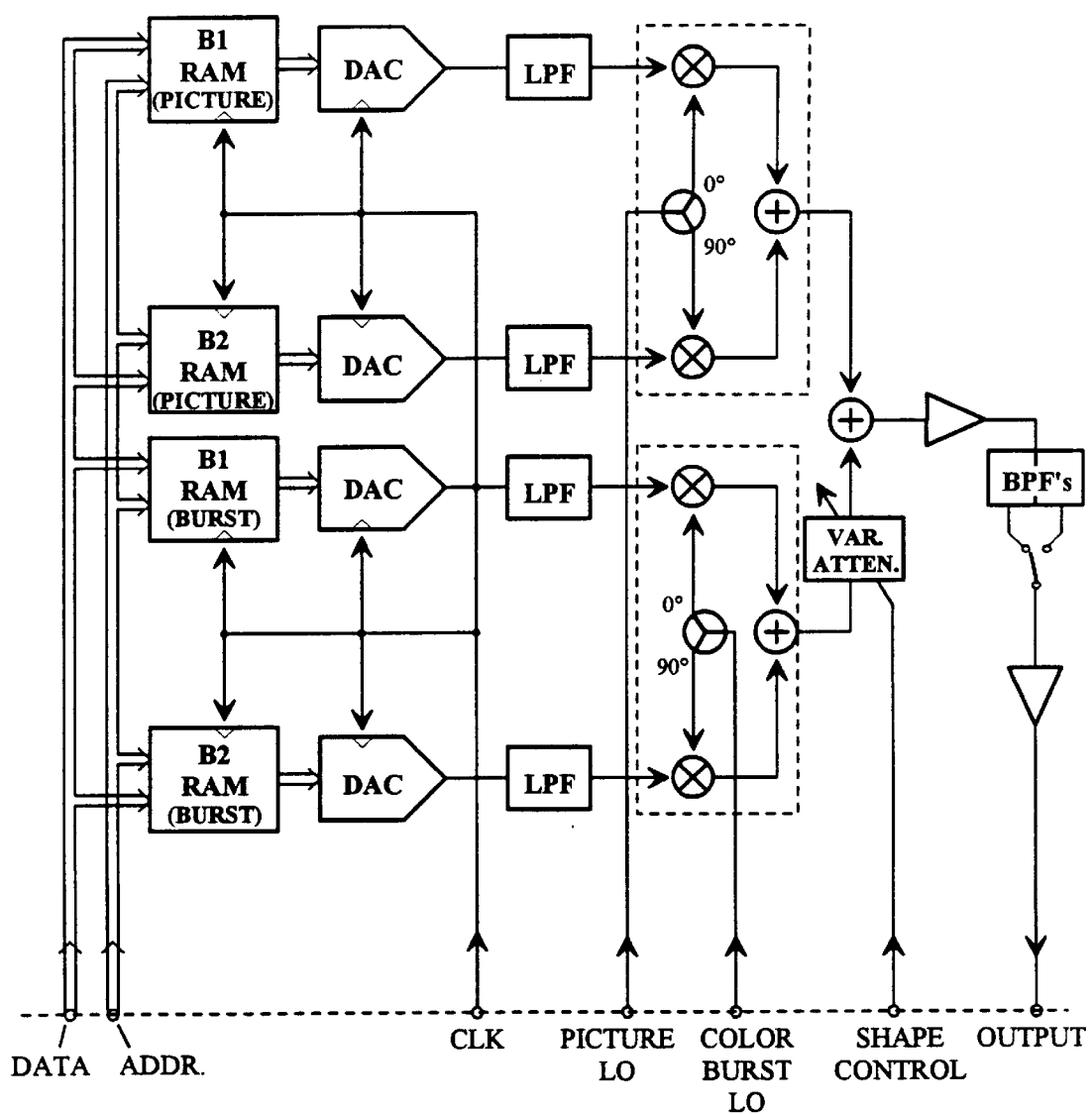
FIG. 16 is a digital broadband generator for the second preferred embodiment of the present invention.

FIG. 15a shows a baseband representation of an RF sync suppression HBI. FIG. 15b depicts the required coherent injection signal for descrambling. Here, due to the attenuation at RF, all signal components are in need of injection including a portion of the color burst. As can be seen, six RAM records are required for generation of the picture carrier portion of the injection signal. These are 1032, 1040, 1038, 1030, 1036, and 1033. Although it may be possible to generate the missing burst signal by VSB generation about the picture carrier, this approach is prohibitively expensive in memory because of the poor congruence between the color subcarrier frequency and 6 MHz.

Figure 17:
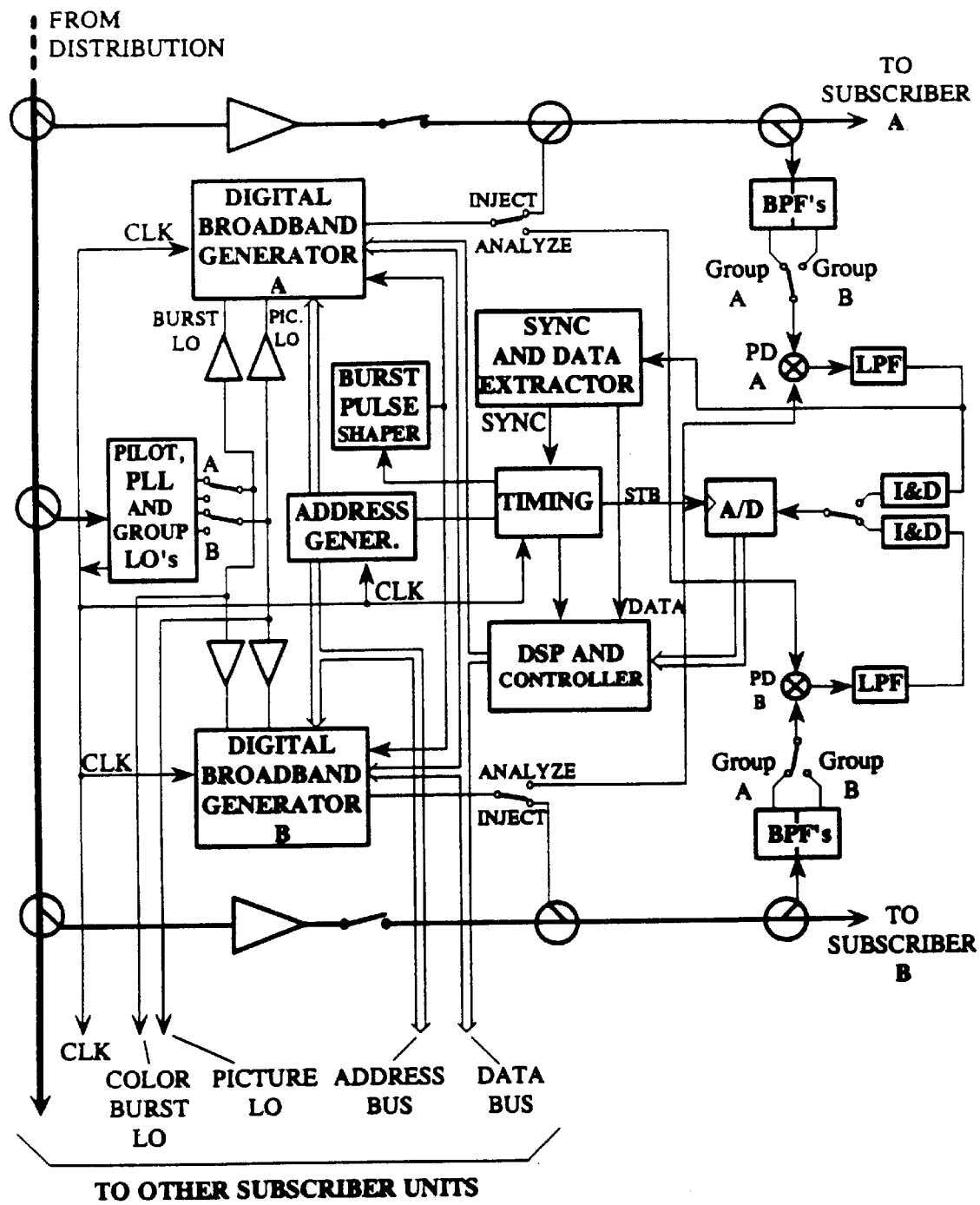
FIG. 17 is a second preferred embodiment of the present invention directed towards use in multiple dwelling units.

An alternative solution is based on the fact that all upper sideband color subcarriers in a frame synchronized video sources are incrementally related with 6 MHz spacing. Hence they can be generated separately with a 3.58 MHz offset local oscillator locked on the color burst of the center carrier channel as shown in the description of the second embodiment of the present invention provided by FIGS. 16 and 17. In a manner similar to the first embodiment, all injected phasors are measured and tracked preferably during the VBI. FIG. 17 shows the arrangement for a Multiple Dwelling Unit ("MDU") subscriber group. Here, the digital broadband generator of subscriber A provides the analysis function during calibrated injection of subscriber B and vice versa.

Figure 18:
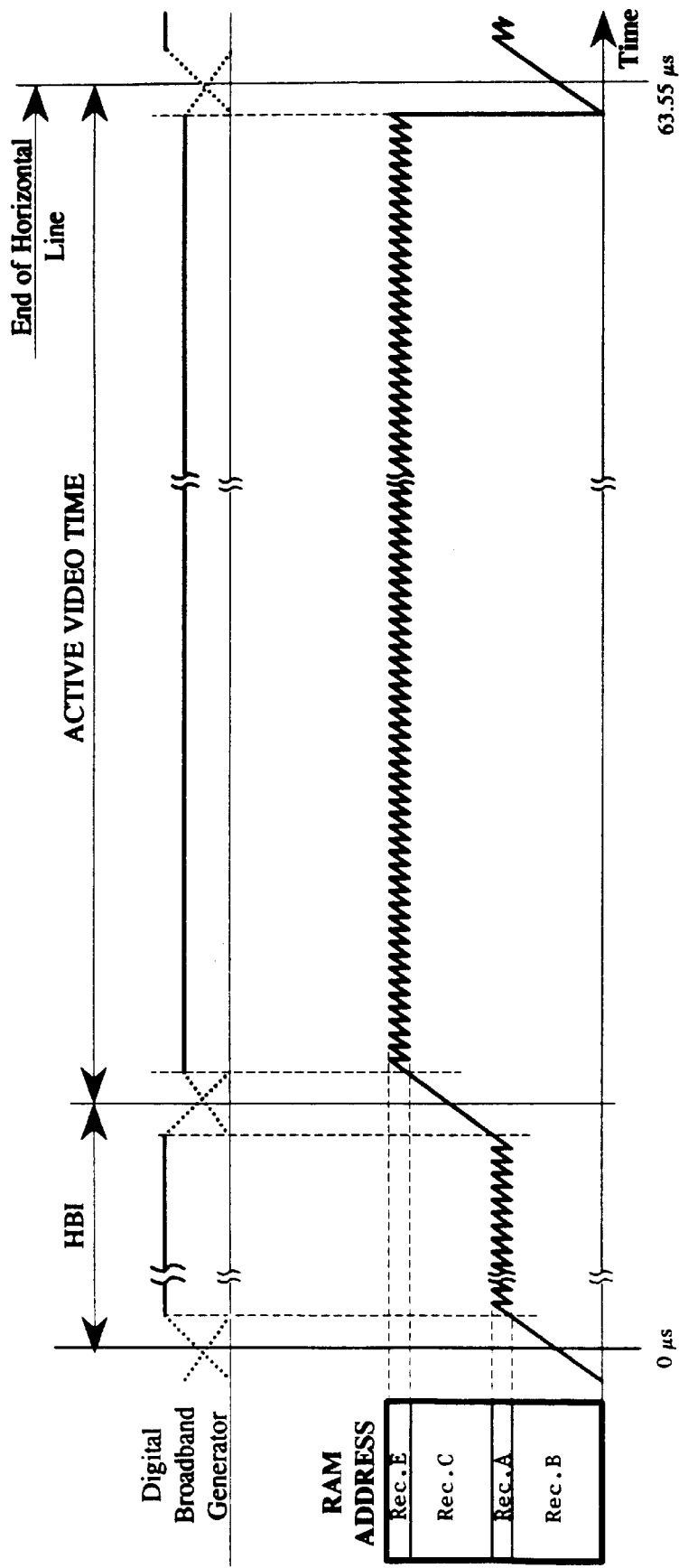
FIG. 18 is a timing and memory diagram for an enhanced security video scrambling using the injection methods of the present invention.

Finally, it is worth noting that if a broadband generator is dedicated to one group during the entire video line, it can generate additional fixed injection signals of varying levels during the active video time so as to provide an additional denial security based on random "video folding". This method can be implemented by effecting gated coherent injection at the headend using some fixed set of injection values governed by cryptographic keystream control and selectively null them out (therefore descramble) at the subscriber location based on precise phasor adjustment. Because the headend injected signal can be in opposite phase, video inversion on only a sector of the screen may take place, further frustrating any existing "pirate" descramblers. FIG. 18 shows the RAM timing diagram for a descrambler utilizing the video folding descrambling and signal denial technique.

What is claimed is:

1. A method for processing a broadband television signal comprised of a plurality of television channels each having a carrier phasor value, said method comprising the steps of:
   independently generating a broadband radio frequency (RF) signal comprised of a plurality of simultaneous RF signals in RF coherence with at least one of said plurality of television channels, each of said plurality of simultaneous RF signals having a phasor value;
   combining said broadband television signal with said broadband radio frequency signal; and
   adjusting said phasor value of at least one of said plurality of simultaneous RF signals in accordance with the corresponding carrier phasor values of said plurality of television channels, so as to maintain a substantially constant relationship therebetween.

2. A method for processing a frame of a television signal having an active video period and a synchronizing period comprising the steps of:
   independently generating a modulated radio frequency (RF) signal having an amplitude and phase characterized by a phasor value and having a frequency substantially equal to that of said television signal, wherein the phasor value of said modulated RF signal during said synchronizing period is substantially different from the phasor value of said modulated RF signal during said active video period; and
   combining said modulated RF signal with said television signal.

3. The method of claim 2 wherein said modulated RF signal is coherent with a carrier of said television signal.

4. The method of claim 3 wherein said television signal is scrambled, said scrambled television signal having suppressed synchronizing pulses.

5. The method of claim 4 wherein said modulated RF signal is coherently combined substantially in phase with said scrambled television signal during said synchronizing period.

6. The method of claim 4 wherein said modulated RF signal is coherently combined substantially out of phase with said scrambled television signal during said synchronizing period.

7. The method of claim 2 wherein the amplitude of said modulated RF signal has a substantially zero value during said active video period such that said processed television signal is substantially identical to said television signal during said active video period.

8. The method of claim 2 wherein the frequency power spectrum of said modulated RF signal is substantially zero at the audio subcarrier frequency of a second television signal transmitted at a lower frequency channel adjacent to the channel of said television signal.

9. The method of claim 2 wherein the frequency power spectrum of said modulated RF signal is vestigial sideband in character.

10. The method of claim 1 wherein at least a portion of said plurality of television channels are transmitted with incrementally related carrier frequencies.

11. The method of claim 3 wherein said modulated RF signal is coherently combined substantially out of phase with said scrambled television signal.

12. The method of claim 4 wherein said modulated RF signal is coherently combined substantially in phase with said scrambled television signal during said active video period.

13. The method of claim 3 further comprising the step of selecting a phasor value for said modulated RF signal during said active video period from a predetermined plurality of fixed and distinct phasor values in response to a cryptographic keystream control.

14. The method of claim 2 applied simultaneously to a plurality of television signals.

15. The method of claim 1 wherein said method is applied in a multichannel television transmission origination facility, thereby transmitting the processed broadband television signal.

16. The method of claim 1 wherein said method is applied in a broadband receiving node, responsive to a broadband multichannel television transmission origination facility, thereby distributing said processed broadband television signal to subscriber terminals.

17. The method of claim 15 wherein at least two of said plurality of television channels have frequencies that are incrementally related by frequency increments that are integral multiples of a predetermined fundamental frequency, said method further comprising the steps of:

generating an RF pilot reference signal having a frequency equal to an integral multiple of said predetermined fundamental frequency;

combining said pilot reference signal with said processed broadband television signal to produce a composite processed broadband television signal; and transmitting said composite processed broadband television signal to receiving nodes.

18. The method of claim 16 wherein at least two of said plurality of television channels have frequencies that are incrementally related by frequency increments that are integral multiples of a predetermined fundamental frequency, and wherein an RF pilot reference signal having a frequency equal to an integral multiple of said predetermined fundamental frequency is transmitted from said broadband multichannel television transmission origination facility, the method further comprising the steps of:

receiving said RF pilot reference signal;

regenerating a local reference signal phase locked to said received RF pilot reference signal; and using said local reference signal to generate said plurality of simultaneous RF signals.

19. The method of claim 14 wherein at least two of said plurality of television signals are modulated in video synchrony.

20. The method of claim 1 wherein at least two of said plurality of television channels are modulated in video synchrony.

21. An apparatus for processing a broadband television signal comprising a plurality of television channels each having a carrier phasor value, said apparatus comprising:

means for independently generating a broadband radio frequency (RF) signal comprising a plurality of simultaneous RF signals in RF coherence with at least one of said plurality of television channels, each of said plurality of simultaneous RF signals having a phasor value;

means for combining said broadband television signal with said broadband radio frequency signal; and means for adjusting said phasor value of at least one of said plurality of simultaneous RF signals in accordance with the corresponding carrier phasor values of said plurality of television channels, so as to maintain a substantially constant relationship therebetween.

22. An apparatus for processing a frame of a television signal having an active video period and a synchronizing period comprising:

means for independently generating a modulated radio frequency (RF) signal having an amplitude and phase characterized by a phasor value and having a frequency substantially equal to that of said television signal, wherein the phasor value of said modulated RF signal during said synchronizing period is substantially different from the phasor value of said modulated RF signal during said active video period; and means for combining said modulated RF signal with said television signal.

23. The apparatus of claim 22 wherein said modulated RF signal is coherent with a carrier of said television signal.

24. The apparatus of claim 23 wherein said modulated RF signal is coherently combined substantially out of phase with said scrambled television signal.

25. The apparatus of claim 23 wherein said television signal is scrambled, said scrambled television signal having suppressed synchronizing pulses.

26. The apparatus of claim 25 wherein said modulated RF signal is coherently combined substantially in phase with said scrambled television signal during said synchronizing period.

27. The apparatus of claim 25 wherein said modulated RF signal is coherently combined substantially out of phase with said scrambled television signal during said synchronizing period.

28. The apparatus of claim 22 wherein the amplitude of said modulated RF signal has a substantially zero value during said active video period such that said processed television signal is substantially identical to said television signal during said active video period.

29. The apparatus of claim 22 wherein the frequency power spectrum of said modulated RF signal is substantially zero at the audio subcarrier frequency of a second television signal transmitted at a lower frequency channel adjacent to the channel of said television signal.

30. The apparatus of claim 22 wherein the frequency power spectrum of said modulated RF signal is vestigial sideband in character.

31. The apparatus of claim 21 wherein at least some of said plurality of television channels are transmitted with incrementally related carrier frequencies.

32. The apparatus of claim 25 wherein said modulated RF signal is coherently combined substantially in phase with said scrambled television signal during said active video period.

33. The apparatus of claim 23 further comprising means for selecting a phasor value for said modulated RF signal during said active video period from a predetermined plurality of fixed and distinct phasor values in response to a cryptographic keystream control.

34. The apparatus of claim 22 capable of processing a plurality of television signals simultaneously.

35. The apparatus of claim 21 wherein said apparatus is employed in a multichannel television transmission origination facility, said facility thereby transmitting the processed broadband television signal.

36. The apparatus of claim 21 wherein said apparatus is employed in a broadband receiving node, said node responsive to a broadband multichannel television transmission origination facility, said node thereby distributing said processed broadband television signal to subscriber terminals.

37. The apparatus of claim 35 wherein at least two of said plurality of television channels have frequencies that are incrementally related by frequency increments that are integral multiples of a predetermined fundamental frequency, said a apparatus further comprising:
   means for generating an RF pilot reference signal having a frequency equal to an integral multiple of said predetermined fundamental frequency;
   means for combining said pilot reference signal with said processed broadband television signal to produce a composite processed broadband television signal; and
   means for transmitting said composite processed broadband television signal to receiving nodes.

38. The apparatus of claim 36 wherein at least two of said plurality of television channels have frequencies that are incrementally related by frequency increments that are integral multiples of a predetermined fundamental frequency, and wherein an RF pilot reference signal having a frequency equal to an integral multiple of said predetermined fundamental frequency is transmitted from said broadband multichannel television transmission origination facility, said apparatus further comprising:
   means for receiving said RF pilot reference signal;
   means for regenerating a local reference signal phase locked to said received RF pilot reference signal; and
   means for using said local reference signal to generate said plurality of simultaneous RF signals.

39. The apparatus of claim 34 wherein at least two of said plurality of television signals are modulated in video synchrony.

40. The apparatus of claim 21 wherein at least two of said plurality of television channels are modulated in video synchrony.

41. An apparatus for processing a broadband signal, said broadband signal comprising a plurality of video frame synchronous television signals each having a phasor value, an active video period and a blanking period, said apparatus comprising:
   means for selecting at least one of said plurality of video frame synchronous television signals;
   means for independently generating at least one radio frequency (RF) signal having a frequency substantially equal to that of said selected at least one of said plurality of video frame synchronous television signals;
   means for simultaneously changing said phasor value for each of at least a portion of said plurality of video frame synchronous television signals such that said change in phasor value during said blanking period is substantially different than said change in phasor value during said active video period; and
   means for combining said at least one RF signal with said selected at least one of said plurality of video frame synchronous television signals.

42. The apparatus of claim 41 wherein said change in phasor value comprises a change in amplitude.

43. The apparatus of claim 41 wherein said selected at least one television signal is denied.

44. The apparatus of claim 41 or 43 wherein said processed broadband signal comprises at least one clear television signal.

45. The apparatus of claim 44 wherein said selected at least one television signal and said at least one clear television signal are determined in accordance with addressable subscription information.

46. The apparatus of claim 41 wherein said at least one independently generated RF signal is coherent with said selected at least one of said television signals.

47. In a subscriber television system, an apparatus for processing a broadband signal, said broadband signal comprising a plurality of television signals received by a subscriber, each of said plurality of television signals having a phasor value, an active video period and a blanking period, said apparatus comprising:
   means for partitioning the set of said plurality of television signals into a first subset of television signals containing at least one television signal and a second subset of television signals that is disjoint from the first subset of television signals, and wherein the partitioning of said plurality of television signals by said partitioning means is further characterized in that the selection of the television signals in each such subset of television signals is in accordance with subscriber subscription information; and
   means for simultaneously changing the phasor value of each of said second subset of television signals, wherein said change of phasor value during the blanking period is substantially different from the change of phasor value during the active video period made.

48. The apparatus of claim 47 wherein said plurality of television signals are video frame synchronous; and wherein said blanking period of said plurality of television signals comprises a horizontal blanking period.

49. The apparatus of claim 48 wherein the video timing of said video frame synchronous television signals are timed so that their respective blanking periods are substantially coincident.

50. The apparatus of claim 48 further comprising means for forming at least two temporally staggered groups of said plurality of television signals so that the horizontal blanking period of all the television signals within any one of said at least two groups are substantially coincident; and wherein the horizontal blanking period of the television signals within any one of said at least two groups are substantially nonoverlapping temporally with the horizontal blanking period of the television signals within any other one of said at least two groups of video frame synchronous television signals.

51. The apparatus of claim 47 wherein said means for simultaneously changing the phasor value further comprises means for performing RF coherent injection.

52. The apparatus of claim 47 wherein said change in phasor value comprises a change in amplitude.

53. The apparatus of claim 47 wherein said subscriber subscription information is conveyed by addressable control.

54. In a subscriber television system, a method for processing a broadband signal comprising a plurality of television signals received by a subscriber, each of said plurality of television signals having a phasor value, an active video period and a blanking period, said method comprising the steps of:

- partitioning the set of said plurality of television signals into a first subset of television signals containing at least one television signal and a second subset of television signals that is disjoint from the first subset of television signals, wherein said partition step is further characterized in that the selection of the television signals in each such subset of television signals is in accordance with subscriber subscription information; and
- simultaneously changing the phasor value of each of said second subset of television signals, wherein said change of phasor value during the blanking period is substantially different from the change of phasor value during the active video period.

55. The method of claim 54 wherein said plurality of television signals are video frame synchronous; and wherein said blanking period of said plurality of television signals comprises a horizontal blanking period.

56. The method of claim 55 wherein the video timing of said video frame synchronous television signals are timed so that their respective blanking periods are substantially coincident.

57. The method of claim 55 further comprising the step of forming at least two temporally staggered groups of said plurality of television signals so that the horizontal blanking period of all the television signals within any one of said at least two groups are substantially coincident; and wherein the horizontal blanking period of the television signals within any one of said at least two groups are substantially nonoverlapping temporally with the horizontal blanking period of the television signals within any other one of said at least two groups of video frame synchronous television signals.

58. The method of claim 54 wherein said step of simultaneously changing the phasor value further comprises the step of RF coherent injection.

59. The method of claim 54 wherein said change in phasor value comprises a change in amplitude.

60. The method of claim 54 wherein said subscriber subscription information is conveyed by addressable control.

61. The method of claim 54 wherein said change in phasor value during the active video period is made in accordance with a cryptographic keystream control.

* * * * *